United States Patent
Ogura et al.

(10) Patent No.: US 10,295,346 B2
(45) Date of Patent: May 21, 2019

(54) PHYSICAL QUANTITY DETECTING VIBRATION ELEMENT, PHYSICAL QUANTITY SENSOR, ELECTRONIC APPARATUS, AND MOVING OBJECT

(71) Applicant: Seiko Epson Corporation, Tokyo (JP)

(72) Inventors: Seiichiro Ogura, Minowa-machi (JP); Ryuta Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 606 days.

(21) Appl. No.: 14/886,681

(22) Filed: Oct. 19, 2015

(65) Prior Publication Data

US 2016/0116285 A1  Apr. 28, 2016

(30) Foreign Application Priority Data

Oct. 28, 2014 (JP) .................................. 2014-219771
Oct. 28, 2014 (JP) .................................. 2014-219772

(51) Int. Cl.
*G01C 19/5705* (2012.01)

(52) U.S. Cl.
CPC ................................. *G01C 19/5705* (2013.01)

(58) Field of Classification Search
None
See application file for complete search history.

(56) References Cited

U.S. PATENT DOCUMENTS

| 2010/0122578 A1* | 5/2010 | Classen ............... G01P 15/0802 |
| | | 73/514.32 |
| 2013/0192367 A1* | 8/2013 | Osawa ..................... G01P 9/04 |
| | | 73/504.12 |
| 2013/0263662 A1* | 10/2013 | Tanaka ................... G01P 1/003 |
| | | 73/504.12 |
| 2014/0208849 A1* | 7/2014 | Zhang .................. G01P 15/125 |
| | | 73/514.32 |
| 2015/0241466 A1* | 8/2015 | Tanaka ................. G01P 15/125 |
| | | 73/514.32 |

FOREIGN PATENT DOCUMENTS

| JP | 2010-256332 A | 11/2010 |
| JP | 2012-079751 A | 4/2012 |
| JP | 2013-181856 A | 9/2013 |

* cited by examiner

*Primary Examiner* — Paul M. West
*Assistant Examiner* — Mark A Shabman
(74) *Attorney, Agent, or Firm* — Oliff PLC

(57) ABSTRACT

A vibration element includes a detection signal electrode provided in a detection vibrating arm, a detection signal terminal which is provided in a support portion and electrically connected to the detection signal electrode, and a detection ground terminal provided in the support portion, and the detection ground terminal is disposed between a first connection portion which is a connection portion with a beam portion of the support portion and a second connection portion which is a connection portion with a beam portion, and is provided to extend to the outside of the first connection portion, and the detection signal terminal is provided between the detection ground terminal and an end portion of the support portion.

12 Claims, 13 Drawing Sheets

PHYSICAL QUANTITY DETECTING VIBRATION ELEMENT, PHYSICAL QUANTITY SENSOR, ELECTRONIC APPARATUS, AND MOVING OBJECT

BACKGROUND

1. Technical Field

The present invention relates to a physical quantity detecting vibration element, a physical quantity sensor, an electronic apparatus, and a moving object.

2. Related Art

As a vibration device for detecting, for example, angular velocity, a vibration element having a base portion which is positioned at a central portion, a pair of detection arms extending from the base portion to both sides in a y-axis direction, a pair of connection arms extending from the base portion to both sides in an x-axis direction, a pair of drive arms extending from a tip portion of the connection arm on one side to both sides in the y-axis direction, a pair of drive arms extending from a tip portion of the connection arm on the other side to both sides in the y-axis direction, a pair of support portions disposed to face each other in the y-axis direction with the base portion interposed therebetween, a pair of beam portions connecting the support portion on one side and the base portion, and a pair of beam portions connecting the support portion on the other side and the base portion is known (refer to, for example, JP-A-2010-256332).

In such a vibration element, a detection signal terminal, a detection ground terminal, and a drive signal terminal are disposed at the support portion on one side, and a detection signal terminal, a detection ground terminal, and a drive ground terminal are disposed at the support portion on the other side. Further, the respective terminals provided in the support portions are aligned with each other to have substantially the same size. Further, a detection ground electrode capable of functioning as a shield layer which can reduce the incorporation of noise to the detection signal terminal or the drive signal terminal is positioned between connection portions with the pair of beam portions of the support portion. For this reason, it is not possible to sufficiently widely form the detection ground terminal, and therefore, it is not possible to sufficiently exhibit a function even as a shield layer.

Further, in such a vibration element, the detection signal terminal and the drive signal terminal are disposed to extend over the lower surface and the upper surface of the support portion. In this manner, the detection signal terminal and the drive signal terminal are disposed to extend over the lower surface and the upper surface of the support portion, whereby the areas of these terminals are increased. Therefore, noise is easily incorporated from the detection signal terminal and the drive signal terminal, and thus there is a problem in that detection accuracy decreases.

SUMMARY

An advantage of some aspects of the invention is to provide a physical quantity detecting vibration element, a physical quantity sensor, an electronic apparatus, and a moving object in which it is possible to reduce a decrease in detection accuracy by reducing the incorporation of noise to a detection signal terminal or a drive signal terminal.

The invention can be implemented as the following forms or application examples.

Application Example 1

A physical quantity detecting vibration element according to this application example includes: a vibration body having a detection vibration portion; a support portion which supports the vibration body and includes a first end portion and a second end portion; a beam portion which connects the vibration body and a portion between the first end portion and the second end portion of the support portion; a detection signal electrode provided in the detection vibration portion; a detection signal terminal which is provided on a principal surface on one side of the support portion and electrically connected to the detection signal electrode; and a constant potential terminal which is provided on the principal surface on one side of the support portion and electrically connected to a constant potential, in which a portion of the constant potential terminal is disposed so as to be positioned further toward the first end portion side than a connection portion with the beam portion of the support portion, and the detection signal terminal is disposed further toward the first end portion side than the constant potential terminal of the support portion.

With this configuration, a vibration element is obtained in which it is possible to reduce the incorporation of noise to the detection signal terminal, and thus it is possible to reduce a decrease in detection accuracy.

Application Example 2

In the physical quantity detecting vibration element according to the application example, it is preferable that the physical quantity detecting vibration element further includes a detection ground electrode provided in the detection vibration portion and the detection ground electrode and the constant potential terminal are electrically connected.

With this configuration, it is possible to electrically connect the constant potential terminal to the constant potential with a simple configuration.

Application Example 3

In the physical quantity detecting vibration element according to the application example, it is preferable that the constant potential terminal is further disposed between the detection signal terminal and the first end portion of the support portion.

With this configuration, it is possible to more effectively reduce the incorporation of noise to the detection signal terminal.

Application Example 4

In the physical quantity detecting vibration element according to the application example, it is preferable that the constant potential terminal is further disposed at a portion overlapping the detection signal terminal on a principal surface on the other side of the support portion.

With this configuration, it is possible to more effectively reduce the incorporation of noise to the detection signal terminal.

Application Example 5

In the physical quantity detecting vibration element according to the application example, it is preferable that the physical quantity detecting vibration element includes a pair of the beam portions and the constant potential terminal is disposed between a first connection portion which is a connection portion with the beam portion on one side of the support portion and a second connection portion which is a connection portion with the beam portion on the other side, and is disposed to extend further to the first end portion side than the first connection portion.

With this configuration, it is possible to more stably connect the vibration body to the support portion.

Application Example 6

In the physical quantity detecting vibration element according to the application example, it is preferable that the constant potential terminal is further disposed to extend further to the second end portion side than the second connection portion.

With this configuration, it is possible to more widely dispose the constant potential terminal.

Application Example 7

In the physical quantity detecting vibration element according to the application example, it is preferable that the vibration body includes a drive vibration portion and the physical quantity detecting vibration element further includes: a drive signal electrode provided in the drive vibration portion; and a drive signal terminal which is provided between the constant potential terminal on the principal surface on one side of the support portion and the second end portion and electrically connected to the drive signal electrode.

With this configuration, it is possible to reduce the incorporation of noise from the drive signal terminal to the detection signal terminal.

Application Example 8

In the physical quantity detecting vibration element according to the application example, it is preferable that the constant potential terminal is further disposed between the drive signal terminal and the second end portion of the support portion.

With this configuration, it is possible to more effectively reduce the incorporation of noise from the drive signal terminal to the detection signal terminal.

Application Example 9

In the physical quantity detecting vibration element according to the application example, it is preferable that the constant potential terminal is further disposed at a portion overlapping the drive signal terminal on the principal surface on the other side of the support portion.

With this configuration, it is possible to more effectively reduce the incorporation of noise from the drive signal terminal to the detection signal terminal.

Application Example 10

A physical quantity detecting vibration element according to this application example includes: a vibration body having a detection vibration portion; a support portion which supports the vibration body; a detection signal electrode provided in the detection vibration portion; a detection signal terminal which is provided on a principal surface on one side of the support portion and electrically connected to the detection signal electrode; and a constant potential electrode which is provided on a principal surface on the other side of the support portion, is positioned so as to overlap the detection signal terminal when viewed in a plan view, and is electrically connected to a constant potential.

With this configuration, a physical quantity detecting vibration element is obtained in which it is possible to reduce a decrease in detection accuracy by reducing the incorporation of noise to the detection signal terminal.

Application Example 11

In the physical quantity detecting vibration element according to the application example, it is preferable that the physical quantity detecting vibration element further includes: a detection ground electrode which is provided in the detection vibration portion and electrically separated from the detection signal electrode; and a detection ground terminal which is provided on the principal surface on one side of the support portion and electrically connected to the detection ground electrode, and the detection ground terminal and the constant potential electrode are electrically connected.

With this configuration, it is possible to simply electrically connect the constant potential electrode to the constant potential.

Application Example 12

In the physical quantity detecting vibration element according to the application example, it is preferable that the constant potential electrode includes a first continuous portion which is continuously provided on the principal surface on one side through a side surface of the support portion, and the detection signal terminal is positioned between the detection ground terminal and the first continuous portion.

With this configuration, it is possible to more effectively reduce the incorporation of noise to the detection signal terminal.

Application Example 13

In the physical quantity detecting vibration element according to the application example, it is preferable that the vibration body includes a drive vibration portion, the physical quantity detecting vibration element further includes: a drive signal electrode provided in the drive vibration portion; and a drive signal terminal which is provided on the principal surface on one side of the support portion and electrically connected to the drive signal electrode, and the constant potential electrode is positioned so as to overlap the drive signal terminal when viewed in a plan view.

With this configuration, it is possible to reduce the incorporation of noise to the drive signal terminal. Further, it is possible to reduce electrostatic coupling between the drive signal terminal and the detection signal terminal, and thus it is possible to effectively reduce, for example, the incorporation of noise from the drive signal terminal to the detection signal terminal.

Application Example 14

In the physical quantity detecting vibration element according to the application example, it is preferable that the constant potential electrode includes a second continuous portion which is continuously provided on the principal surface on one side through a side surface of the support portion and the drive signal terminal is positioned between the detection ground terminal and the second continuous portion.

With this configuration, it is possible to more effectively reduce the incorporation of noise to the drive signal terminal. Further, it is possible to reduce electrostatic coupling between the drive signal terminal and the detection signal terminal, and thus it is possible to more effectively reduce, for example, the incorporation of noise from the drive signal terminal to the detection signal terminal.

Application Example 15

In the physical quantity detecting vibration element according to the application example, it is preferable that the detection ground terminal is positioned between the detection signal terminal and the drive signal terminal.

With this configuration, it becomes easy to dispose the first continuous portion and the second continuous portion.

Application Example 16

A physical quantity sensor according to this application example includes: the physical quantity detecting vibration element according to the application example.

With this configuration, a physical quantity sensor having high reliability is provided.

Application Example 17

An electronic apparatus according to this application example includes: the physical quantity detecting vibration element according to the application example.

With this configuration, the electronic apparatus having high reliability is provided.

Application Example 18

A moving object according to this application example includes: the physical quantity detecting vibration element according to the application example.

With this configuration, a moving object having high reliability is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity detecting vibration element, an electronic apparatus, and a moving object according to the invention will be described in detail based on an embodiment shown in the accompanying drawings.

1. Vibration Element

First, a preferred embodiment of the physical quantity detecting vibration element according to the invention will be described.

Figure 1:
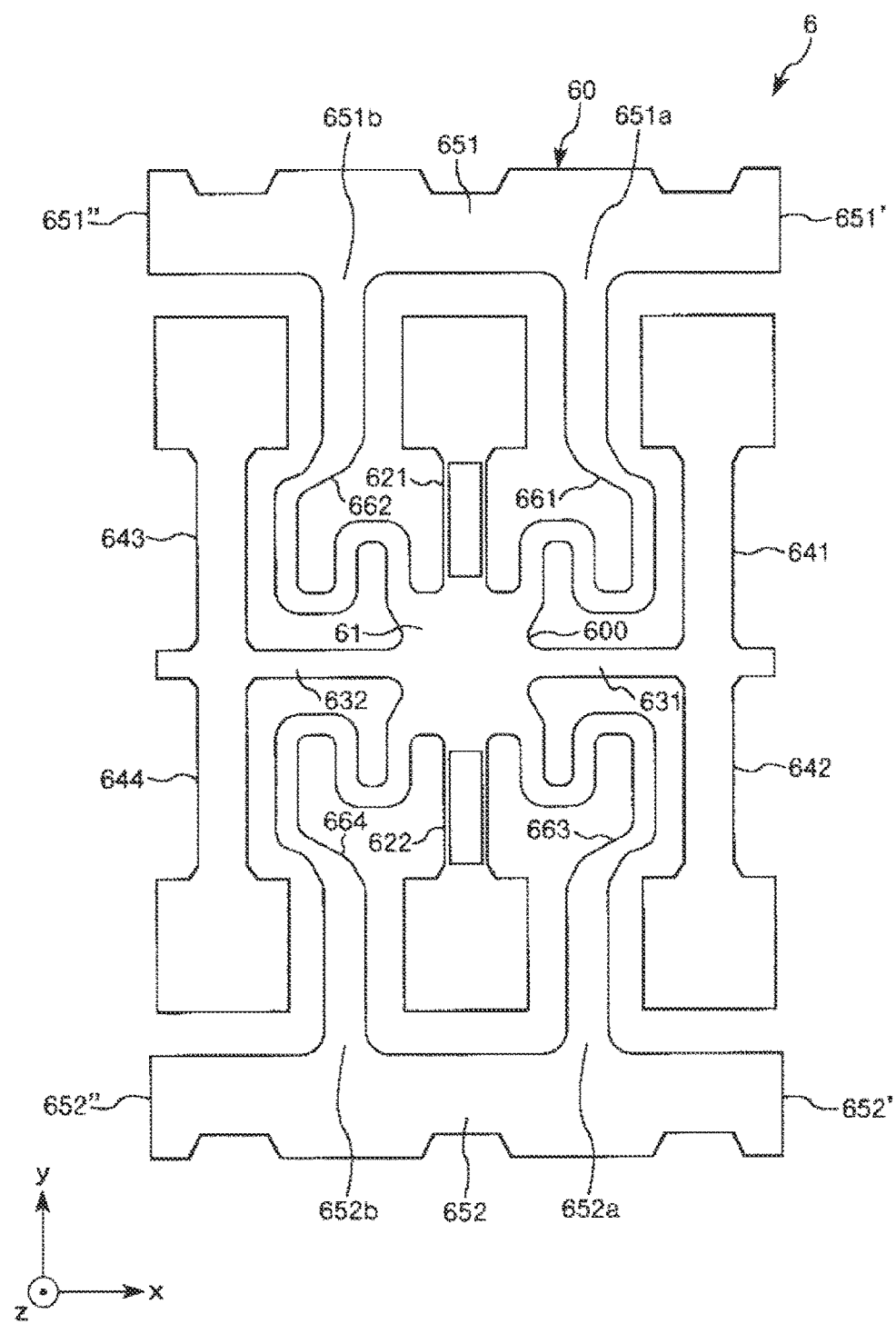
FIG. 1 is a plan view showing a physical quantity detecting vibration element according to a preferred embodiment of the invention.
Figure 2:
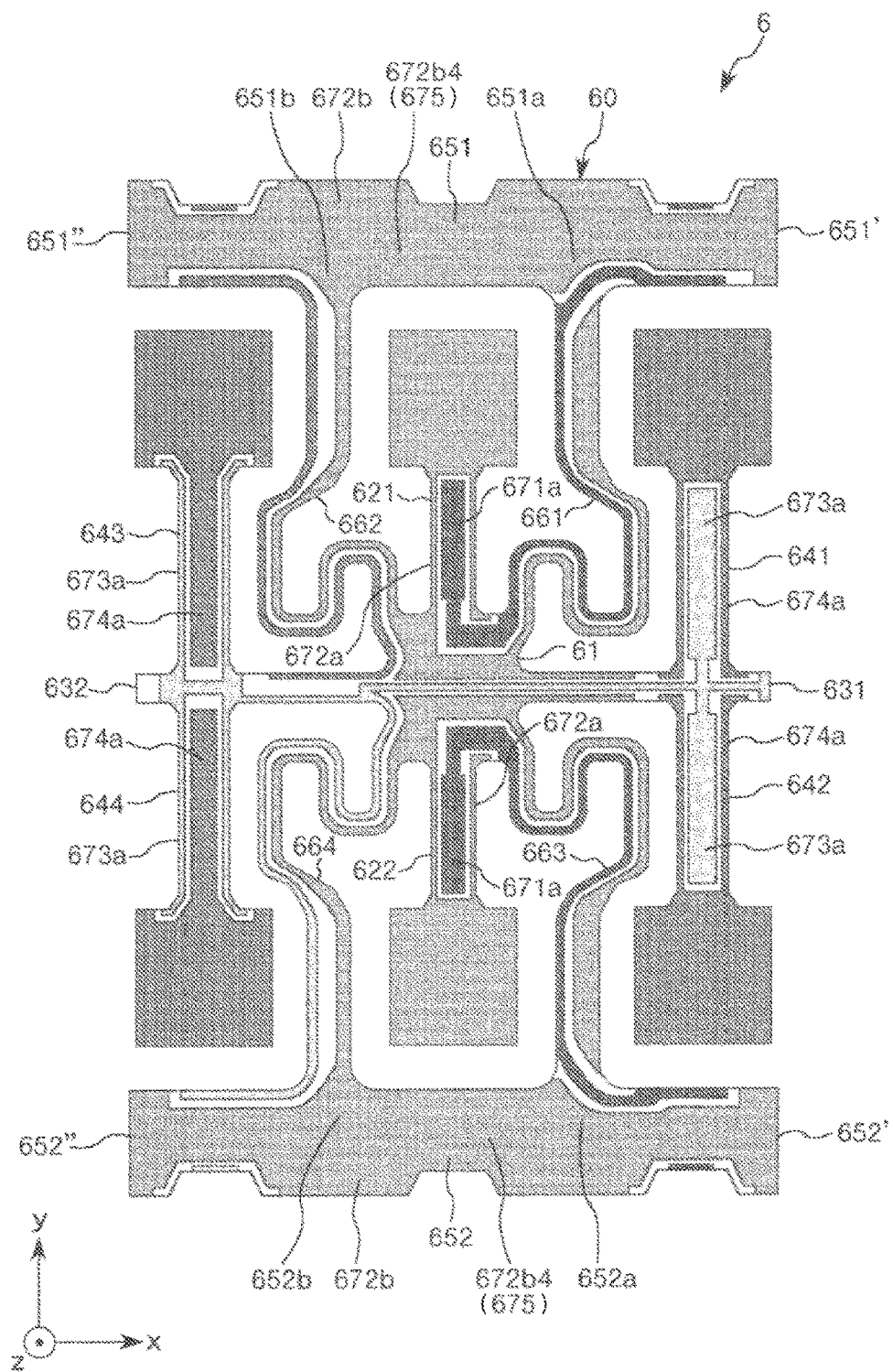
FIG. 2 is a plan view showing an electrode of the physical quantity detecting vibration element shown in FIG. 1.
Figure 3:
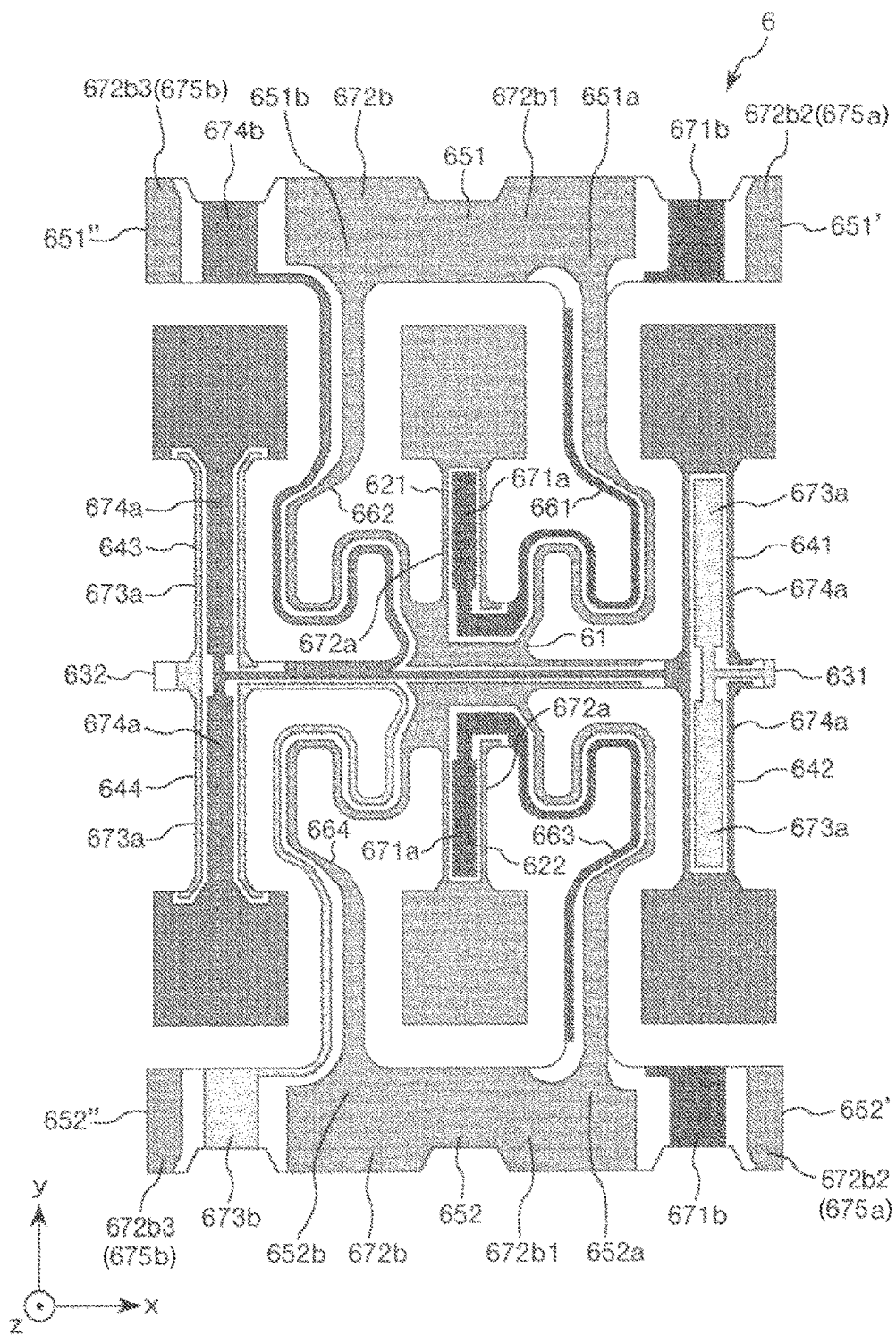
FIG. 3 is a plan view (a transparent view) showing the electrode of the physical quantity detecting vibration element shown in FIG. 1.

FIG. 1 is a plan view showing a physical quantity detecting vibration element according to a preferred embodiment of the invention. FIG. 2 is a plan view showing an electrode of the physical quantity detecting vibration element shown in FIG. 1. FIG. 3 is a plan view (a transparent view) showing the electrode of the physical quantity detecting vibration element shown in FIG. 1. In addition, in FIG. 1, for convenience of description, illustration of the electrode is omitted. Further, in the following, as shown in FIG. 1, the crystal axes of a quartz crystal will be referred to as an x-axis (an electrical axis), a y-axis (a machine axis), and a z-axis (an optical axis), and a direction along the x-axis will also be referred to as an "x-axis direction", a direction along the y-axis will also be referred to as a "y-axis direction", and a direction along the z-axis will also be referred to as a "z-axis direction".

A vibration element (a physical quantity detecting vibration element) 6 shown in FIG. 1 is a gyro element capable of detecting angular velocity. The vibration element 6 includes a vibrator element 60 made of a quartz crystal, and an electrode disposed at the vibrator element 60, as shown in FIG. 1. However, as a material of the vibrator element 60, it is not limited to the quartz crystal, and it is also possible to use a piezoelectric material other than the quartz crystal, such as lithium tantalate or lithium niobate, for example.

The vibrator element 60 has a plate shape spreading in an x-y plane which is defined by the x-axis and the y-axis which are the crystal axes of the quartz crystal, and has a thickness in the z-axis direction. However, for example, the z-axis may be slightly shifted with respect to a thickness direction. That is, with respect to a cut angle of the quartz crystal, there is no limitation thereto as long as it is possible to achieve an object.

Further, the vibrator element 60 includes a base portion 61, detection vibrating arms 621 and 622 as a pair of detection vibration portions extending from the base portion 61 to both sides in the y-axis direction, a pair of connection arms 631 and 632 extending from the base portion 61 to both sides in the x-axis direction, drive vibrating arms 641 and 642 as a pair of drive vibration portions extending from a tip portion of the connection arm 631 to both sides in the y-axis direction, drive vibrating arms 643 and 644 as a pair of drive vibration portions extending from a tip portion of the connection arm 632 to both sides in the y-axis direction, a pair of support portions 651 and 652 supporting the base portion 61, a pair of beam portions 661 and 662 connecting the support portion 651 and the base portion 61, and a pair of beam portions 663 and 664 connecting the support portion 652 and the base portion 61. Then, a vibration body 600 is configured with the base portion 61, the detection vibrating arms 621 and 622, the connection arms 631 and 632, and the drive vibrating arms 641 to 644.

Further, the support portion 651 is provided to extend in the x-axis direction and is connected to the beam portion 661 passing between the detection vibrating arm 621 and the drive vibrating arm 641, between a central portion and an end portion (a first end portion) 651' on the +x-axis side, and connected to the beam portion 662 passing between the detection vibrating arm 621 and the drive vibrating arm 643, between the central portion and an end portion (a second end portion) 651" on the −x-axis side. Similarly, the support portion 652 is provided to extend in the x-axis direction and is connected to the beam portion 663 passing between the detection vibrating arm 622 and the drive vibrating arm 642, between a central portion and an end portion (a first end portion) 652' on the +x-axis side, and connected to the beam portion 664 passing between the detection vibrating arm 622 and the drive vibrating arm 644, between the central portion and an end portion (a second end portion) 652" on the −x-axis side. In this manner, by connecting the two beam portions to each of the support portions 651 and 652, it is possible to more stably support the vibration body 600. In addition, in the following, for convenience of description, a connection portion with the beam portion 661 of the support portion 651 will be referred to as a "first connection portion 651a", and a connection portion with the beam portion 662 of the support portion 651 will be referred to as a "second connection portion 651b". Further, a connection portion with the beam portion 663 of the support portion 652 will also be referred to as a "first connection portion 652a", and a connection portion with the beam portion 664 of the support portion 652 will also be referred to as a "second connection portion 652b".

The vibration element 6 is fixed to an object (for example, an IC 3 (described later)) at the support portions 651 and 652.

Further, grooves extending along the y-axis direction are formed in both principal surfaces (the upper surface and the lower surface) of each of the detection vibrating arms 621 and 622, and thus each of the detection vibrating arms 621 and 622 has a substantially H-shaped cross-sectional shape. Further, a wide hammerhead (weight portion) is provided at a tip portion of each of the detection vibrating arms 621 and 622 and the drive vibrating arms 641, 642, 643, and 644. However, the grooves may be omitted from the detection vibrating arms 621 and 622, and the hammerheads may be omitted from the detection vibrating arms 621 and 622 and the drive vibrating arms 641, 642, 643, and 644. Further, each of the drive vibrating arms 641, 642, 643, and 644 may have a substantially H-shaped cross-sectional shape by forming grooves in both principal surfaces thereof.

Next, the electrode disposed at the vibrator element 60 will be described.

As shown in FIGS. 2 and 3, the electrode includes a detection signal electrode 671a, a detection signal terminal 671b, a detection ground electrode 672a, a detection ground terminal (a constant potential terminal) 672b, a drive signal electrode 673a, a drive signal terminal 673b, a drive ground electrode 674a, and a drive ground terminal 674b.

Drive Signal Electrode and Drive Signal Terminal

The drive signal electrodes 673a are disposed on the upper surface and the lower surface (portions excluding the hammerhead) of each of the drive vibrating arms 641 and 642 and both side surfaces of each of the drive vibrating arms 643 and 644. The drive signal electrodes 673a are electrodes for exciting the drive vibration of the drive vibrating arms 641 to 644.

The drive signal terminal 673b is disposed on the lower surface of the support portion 652. Further, the drive signal terminal 673b is disposed further toward the −x-axis side than the second connection portion 652b of the support portion 652, that is, between the second connection portion 652b and the end portion 652". Further, the drive signal terminal 673b is electrically connected to the drive signal electrodes 673a disposed at the drive vibrating arms 641 to 644, through drive signal wiring disposed at the beam portion 664.

Drive Ground Electrode and Drive Ground Terminal

The drive ground electrodes 674a are disposed on the upper surface and the lower surface (portions excluding the hammerhead) of each of the drive vibrating arms 643 and 644 and both side surfaces of each of the drive vibrating arms 641 and 642. The drive ground electrodes 674a have an electric potential which becomes a constant potential (for example, a reference potential such as a ground) with respect to the drive signal electrodes 673a.

The drive ground terminal 674b is disposed on the lower surface of the support portion 651. Further, the drive ground terminal 674b is disposed further toward the −x-axis side than the second connection portion 651b of the support portion 651, that is, between the second connection portion 651b and the end portion 651". Further, the drive ground terminal 674b is electrically connected to the drive ground electrodes 674a disposed at the drive vibrating arms 641 to 644, through drive ground wiring disposed at the beam portion 662.

The drive signal electrodes 673a, the drive signal terminal 673b, the drive ground electrodes 674a, and the drive ground terminal 674b are disposed, whereby it is possible to drive and vibrate the drive vibrating arms 641 to 644 by generating an electric field between the drive signal electrode 673a and the drive ground electrode 674a disposed at each of the drive vibrating arms 641 to 644 by applying a drive signal (voltage) between the drive signal terminal 673b and the drive ground terminal 674b.

Detection Signal Electrode and Detection Signal Terminal

The detection signal electrodes 671a are disposed on the upper surface and the lower surface (the inner surfaces of the grooves) of each of the detection vibrating arms 621 and 622. The detection signal electrodes 671a are electrodes for detecting an electric charge which is generated by the detection vibration when the detection vibration of the detection vibrating arms 621 and 622 is excited.

One detection signal terminal 671b is disposed for each of the support portions 651 and 652. The detection signal terminal 671b which is disposed at the support portion 651 is disposed on the lower surface (the principal surface on one side) of the support portion 651. Further, the detection signal terminal 671b is disposed further toward the +x-axis side than the first connection portion 651a of the support portion 651, that is, between the first connection portion 651a and the end portion 651'. Further, the detection signal terminal 671b is electrically connected to the detection signal electrode 671a disposed at the detection vibrating arm 621, through detection signal wiring formed at the beam portion 661. On the other hand, the detection signal terminal 671b which is disposed at the support portion 652 is disposed on the lower surface of the support portion 652. Further, the detection signal terminal 671b is disposed further toward the +x-axis side than the first connection portion 652a of the support portion 652, that is, between the first connection portion 652a and the end portion 652'. Further, the detection signal terminal 671b is electrically connected to the detection signal electrode 671a disposed at the detection vibrating arm 622, through detection signal wiring disposed at the beam portion 663.

Detection Ground Electrode and Detection Ground Terminal

The detection ground electrodes 672a are disposed on both side surfaces of each of the detection vibrating arms 621 and 622. The detection ground electrodes 672a have an electric potential which becomes a constant potential (for example, a reference potential such as a potential which becomes a ground) with respect to the detection signal electrodes 671a.

The detection ground terminal 672b is disposed at each of the support portions 651 and 652. The detection ground terminal 672b disposed at each of the support portions 651 and 652 includes a first portion 672b1 which is positioned at a central portion of the lower surface (the principal surface on one side) of each of the support portions 651 and 652, a second portion 672b2 which is positioned on the end portion 651' side of the lower surface of each of the support portions 651 and 652, a third portion 672b3 which is positioned on the end portion 651" side of the lower surface of each of the support portions 651 and 652, and a fourth portion 672b4 which is positioned on the upper surface (the principal surface on the other side) of each of the support portions 651 and 652. Further, the detection ground terminal 672b is electrically connected to the detection ground electrode 672a disposed at the detection vibrating arm 621, through detection ground wiring disposed at the beam portions 661 and 662.

In addition, the fourth portion 672b4 is disposed to extend over almost the entire area (almost the entire width) of the upper surface of each of the support portions 651 and 652 and is connected to each of the first portion 672b1, the second portion 672b2, and the third portion 672b3 through the side surface of each of the support portions 651 and 652. Further, the fourth portion 672b4 is disposed to overlap the detection signal terminal 671b and the drive ground terminal 674b when viewed in a plan view viewed from the z-axis direction.

Further, in the following description, the fourth portion 672b4 which is positioned on the upper surface (the principal surface on the other side) of each of the support portions 651 and 652, of the detection ground terminal 672b, will be referred to as a constant potential electrode 675, as distinguished from the first portion 672b1 which is positioned on the lower surface (the principal surface on one side) of each of the support portions 651 and 652.

The first portion 672b1 (the detection ground terminal 672b) is disposed at each of the support portions 651 and 652. The first portion 672b1 (the detection ground terminal 672b) on one side is disposed between the first connection portion 651a and the second connection portion 651b of the support portion 651 and on both sides thereof along the x-axis. More specifically, the first portion 672b1 (the detection ground terminal 672b) is disposed between the first connection portion 651a and the second connection portion 651b on the lower surface (the principal surface on one side) of the support portion 651, and an end portion on the +x-axis side is positioned further toward the end portion 651' side than the first connection portion 651a and an end portion on the −x-axis side is positioned further toward the end portion 651" side than the second connection portion 651b. That is, the first portion 672b1 (the detection ground terminal 672b) is disposed to extend further from the +x-axis side than the first connection portion 651a of the support portion 651 to the −x-axis side of the second connection portion 651b. The width (the length in the x-axis direction) of the first portion 672b1 (the detection ground terminal 672b) is greater than the width of the detection signal terminal 671b and the width of the drive ground terminal 674b. Further, the first portion 672b1 (the detection ground terminal 672b) is electrically connected to the detection ground electrode 672a disposed at the detection vibrating arm 621, through the detection ground wiring disposed at the beam portions 661 and 662.

The first portion 672b1 (the detection ground terminal 672b) on the other side is disposed between the first connection portion 652a and the second connection portion 652b of the support portion 652 and on both sides thereof along the x-axis. More specifically, the first portion 672b1 (the detection ground terminal 672b) is disposed between the first connection portion 652a and the second connection portion 652b on the lower surface (the principal surface on one side) of the support portion 652, and an end portion on the +x-axis side is positioned further toward the end portion 652' side than the first connection portion 652a and an end portion on the −x-axis side is positioned further toward the end portion 652" side than the second connection portion 652b. That is, the first portion 672b1 (the detection ground terminal 672b) is disposed to extend further from the +x-axis side than the first connection portion 652a of the support portion 652 to the −x-axis side of the second connection portion 652b. The width (the length in the x-axis direction) of the first portion 672b1 (the detection ground terminal 672b) is greater than the width of the detection signal terminal 671b and the width of the drive signal terminal 673b. Further, the first portion 672b1 (the detection ground terminal 672b) is electrically connected to the detection ground electrode 672a disposed at the detection vibrating arm 622, through detection ground wiring disposed at the beam portions 663 and 664.

As described above, the detection signal electrode 671a, the detection signal terminal 671b, the detection ground electrode 672a, and the first portion 672b1 (the detection ground terminal 672b) are disposed, whereby detection vibration generated in the detection vibrating arm 621 appears as an electric charge between the detection signal electrode 671a and the detection ground electrode 672a disposed at the detection vibrating arm 621 and can be extracted as a signal from between the detection signal terminal 671b and the first portion 672b1 (the detection ground terminal 672b) disposed at the support portion 651. Further, detection vibration generated in the detection vibrating arm 622 appears as an electric charge between the detection signal electrode 671a and the detection ground electrode 672a disposed at the detection vibrating arm 622 and can be extracted as a signal from between the detection signal terminal 671b and the first portion 672b1 (the detection ground terminal 672b) disposed at the support portion 652.

Further, the fourth portion 672b4 (the constant potential electrode 675) is disposed on the upper surface (the principal surface on the other side) of each of the support portions 651 and 652. The fourth portion 672b4 (the constant potential electrode 675) disposed at the support portion 651 is disposed on the upper surface of the support portion 651 and electrically connected to the detection ground terminal 672b on the support portion 651 through the side surface of the support portion 651. On the other hand, the fourth portion 672b4 (the constant potential electrode 675) disposed at the support portion 652 is disposed on the upper surface of the support portion 652 and electrically connected to the detection ground terminal 672b on the support portion 652 through the side surface of the support portion 652. For this reason, the fourth portions 672b4 (the constant potential electrodes 675) have an electric potential which becomes a ground with respect to the detection signal electrodes 671a, similarly to the detection ground terminals 672b. That is, the fourth portions 672b4 (the constant potential electrodes 675) are electrically connected to a constant potential.

Further, the fourth portion 672b4 (the constant potential electrode 675) is disposed over almost the entire area of the upper surface of each of the support portions 651 and 652. For this reason, in the support portion 651, the fourth portion 672b4 (the constant potential electrode 675) is disposed to overlap the detection signal terminal 671b and the drive ground terminal 674b when viewed in a plan view viewed from the z-axis direction, and in the support portion 652, the fourth portion 672b4 (the constant potential electrode 675) is disposed to overlap the detection signal terminal 671b and the drive signal terminal 673b when viewed in a plan view viewed from the z-axis direction.

Further, the fourth portion 672b4 (the constant potential electrode 675) disposed at the support portion 651 includes the second portion (a first wraparound portion as a first continuous portion) 672b2 which wraps around to the end portion 651' on the lower surface of the support portion 651 via the side surface of the support portion 651, and the third portion (a second wraparound portion as a second continuous portion) 672b3 which wraps around to the end portion 651" on the lower surface. In other words, the fourth portion 672b4 (the constant potential electrode 675) disposed at the support portion 651 includes the second portion (the first continuous portion) 672b2 continuously provided at the end portion 651' on the lower surface of the support portion 651 via the side surface of the support portion 651, and the third portion (the second continuous portion) 672b3 continuously provided at the end portion 651" on the lower surface. Then, the detection signal terminal 671b is positioned between the first portion 672b1 (the detection ground terminal 672b) and the second portion (the first continuous portion) 672b2, and the drive ground terminal 674b is positioned between the first portion 672b1 (the detection ground terminal 672b) and the third portion (the second continuous portion) 672b3.

On the other hand, the fourth portion 672b4 (the constant potential electrode 675) disposed at the support portion 652 includes the second portion (the first continuous portion) 672b2 which wraps around to the end portion 652' on the lower surface of the support portion 652 via the side surface of the support portion 652, and the third portion (the second continuous portion) 672b3 which wraps around to the end portion 652" on the lower surface. Then, the detection signal terminal 671b is positioned between the second portion (the first continuous portion) 672b2 and the first portion 672b1 (the detection ground terminal 672b), and the drive signal terminal 673b is positioned between the third portion (the second continuous portion) 672b3 and the first portion 672b1 (the detection ground terminal 672b).

In this manner, the second portion (the first continuous portion) 672b2 is provided at the end portion on the +x-axis side of each of the support portions 651 and 652. On the other hand, the third portion (the second continuous portion) 672b3 is provided at the end portion on the −x-axis side of each of the support portions 651 and 652.

In this manner, by sandwiching the detection signal terminal 671b between the second portion (the first continuous portion) 672b2 and the first portion 672b1 (the detection ground terminal 672b) on the lower surface of each of the support portions 651 and 652 and sandwiching the drive signal terminal 673b between the third portion (the second continuous portion) 672b3 and the first portion 672b1 (the detection ground terminal 672b) on the lower surface of the support portion 652, it is possible to more effectively reduce the incorporation of noise to the detection signal terminal 671b and the drive signal terminal 673b.

Further, as described above, in the support portion 651, the first portion 672b1 (the detection ground terminal 672b) is positioned between the detection signal terminal 671b and the drive ground terminal 674b, and therefore, it becomes easy to make the detection signal terminal 671b be positioned between the second portion (the first continuous portion) 672b2 and the first portion 672b1 (the detection ground terminal 672b). Further, in the support portion 652, the first portion 672b1 (the detection ground terminal 672b) is positioned between the detection signal terminal 671b and the drive signal terminal 673b, and therefore, it becomes easy to make the detection signal terminal 671b be positioned between the second portion (the first continuous portion) 672b2 and the detection ground terminal 672b and it becomes easy to make the drive signal terminal 673b be positioned between the third portion (the second continuous portion) 672b3 and the first portion 672b1 (the detection ground terminal 672b).

Further, the first portion 672b1 (the detection ground terminal 672b) is disposed to extend further to the end portion 651' side than the first connection portions 651a and 652a, and therefore, it is possible to dispose the first portion 672b1 (the detection ground terminal 672b) widely and in the vicinity of the detection signal terminal 671b. The first portion 672b1 (the detection ground terminal 672b) functions as a shield layer which reduces the incorporation of noise to the detection signal terminal 671b, and therefore, by disposing the first portion 672b1 (the detection ground terminal 672b) in this manner, it is possible to reduce the incorporation of noise to the detection signal terminal 671b.

In particular, in this embodiment, the detection ground terminal 672b includes the second portion (the first continuous portion) 672b2 and the detection signal terminal 671b is sandwiched between the first portion 672b1 (the detection ground terminal 672b) and the second portion (the first continuous portion) 672b2. Therefore, the shielding effect described above is further improved. In addition, in this embodiment, the first portion 672b1 (the detection ground terminal 672b) is connected to the fourth portion 672b4, and therefore, the detection signal terminal 671b is sandwiched therebetween from the front and the back, and thus the above-described shielding effect is further improved. Further, the first portion 672b1 (the detection ground terminal 672b) extends further to the end portion 652" side than the second connection portion 652b, and therefore, it is possible to widely dispose the first portion 672b1 (the detection ground terminal 672b) and it is possible to effectively reduce the incorporation of noise from the drive signal terminal 673*b* or the drive signal wiring to the detection signal terminal 671*b*.

In this manner, in the vibration element 6, it is possible to reduce the incorporation of noise to the detection signal terminal 671*b* or the drive signal terminal 673*b*, and therefore, it is possible to reduce a decrease in angular velocity detection accuracy of the vibration element 6. In other words, it is possible to improve the angular velocity detection accuracy of the vibration element 6. In particular, as described above, the fourth portion 672*b*4 (the constant potential electrode 675) is disposed over almost the entire area of the upper surface of each of the support portions 651 and 652, whereby the effect thereof becomes more pronounced.

Further, the detection signal electrode 671*a*, the detection signal terminal 671*b*, the detection ground electrode 672*a*, and the first portion 672*b*1 (the detection ground terminal 672*b*) are disposed, whereby the detection vibration generated in the detection vibrating arm 621 appears as an electric charge between the detection signal electrode 671*a* and the detection ground electrode 672*a* disposed at the detection vibrating arm 621 and can be extracted as a signal from between the detection signal terminal 671*b* and the first portion 672*b*1 (the detection ground terminal 672*b*) disposed at the support portion 651. Further, the detection vibration generated in the detection vibrating arm 622 appears as an electric charge between the detection signal electrode 671*a* and the detection ground electrode 672*a* disposed at the detection vibrating arm 622 and can be extracted as a signal from between the detection signal terminal 671*b* and the first portion 672*b*1 (the detection ground terminal 672*b*) disposed at the support portion 652.

Further, in the support portions 651 and 652, the fourth portion 672*b*4 (the constant potential electrode 675) is disposed so as to overlap the detection signal terminal 671*b*, whereby the fourth portion 672*b*4 (the constant potential electrode 675) functions as a shield layer, and thus it is possible to reduce (preferably, prevent) the incorporation of noise to the detection signal terminal 671*b*. In particular, in the support portion 652, the fourth portion 672*b*4 (the constant potential electrode 675) is disposed to overlap the drive signal terminal 673*b* as well, and therefore, it is possible to reduce the incorporation of noise from the drive signal terminal 673*b* to the detection signal terminal 671*b* and it is possible to reduce the incorporation of noise to the drive signal terminal 673*b*. In this manner, by reducing the incorporation of noise to the detection signal terminal 671*b* and the drive signal terminal 673*b*, it is possible to improve the angular velocity detection accuracy of the vibration element 6. In particular, as described above, the fourth portion 672*b*4 (the constant potential electrode 675) is disposed over almost the entire area of the upper surface of each of the support portions 651 and 652, whereby the effect thereof becomes more pronounced.

In addition, as the configuration of the electrode as described above, there is no particular limitation as long as it has electrical conductivity. However, for example, the electrode can be configured with a metal coating formed by stacking each coating of Ni (nickel), Au (gold), Ag (silver), Cu (copper), or the like on a metallization layer (a foundation layer) of Cr (chromium), W (tungsten), or the like.

2. Physical Quantity Sensor

Figure 4:
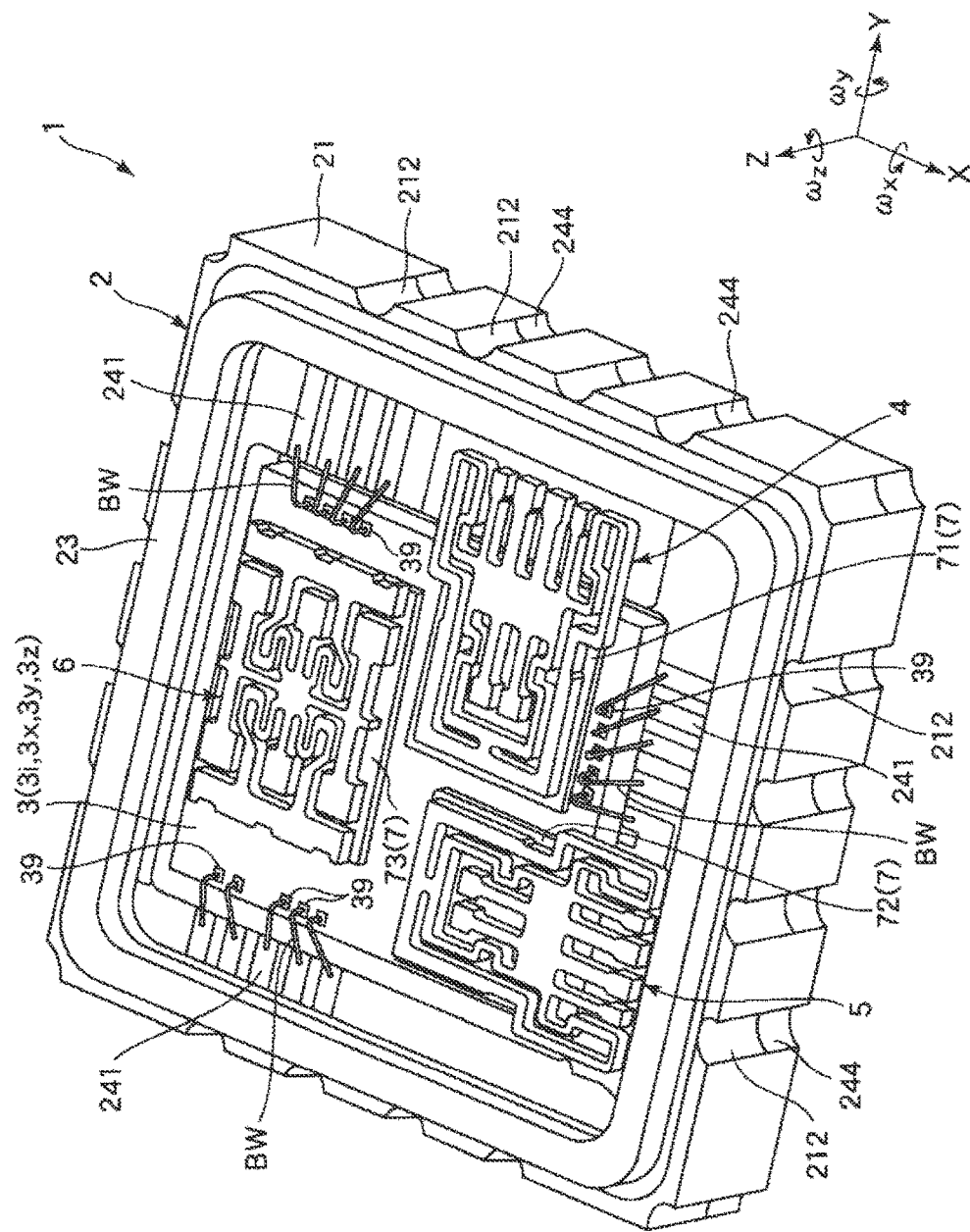
FIG. 4 is a perspective view showing an example of a physical quantity sensor which is provided with the physical quantity detecting vibration element according to the invention.
Figure 5:
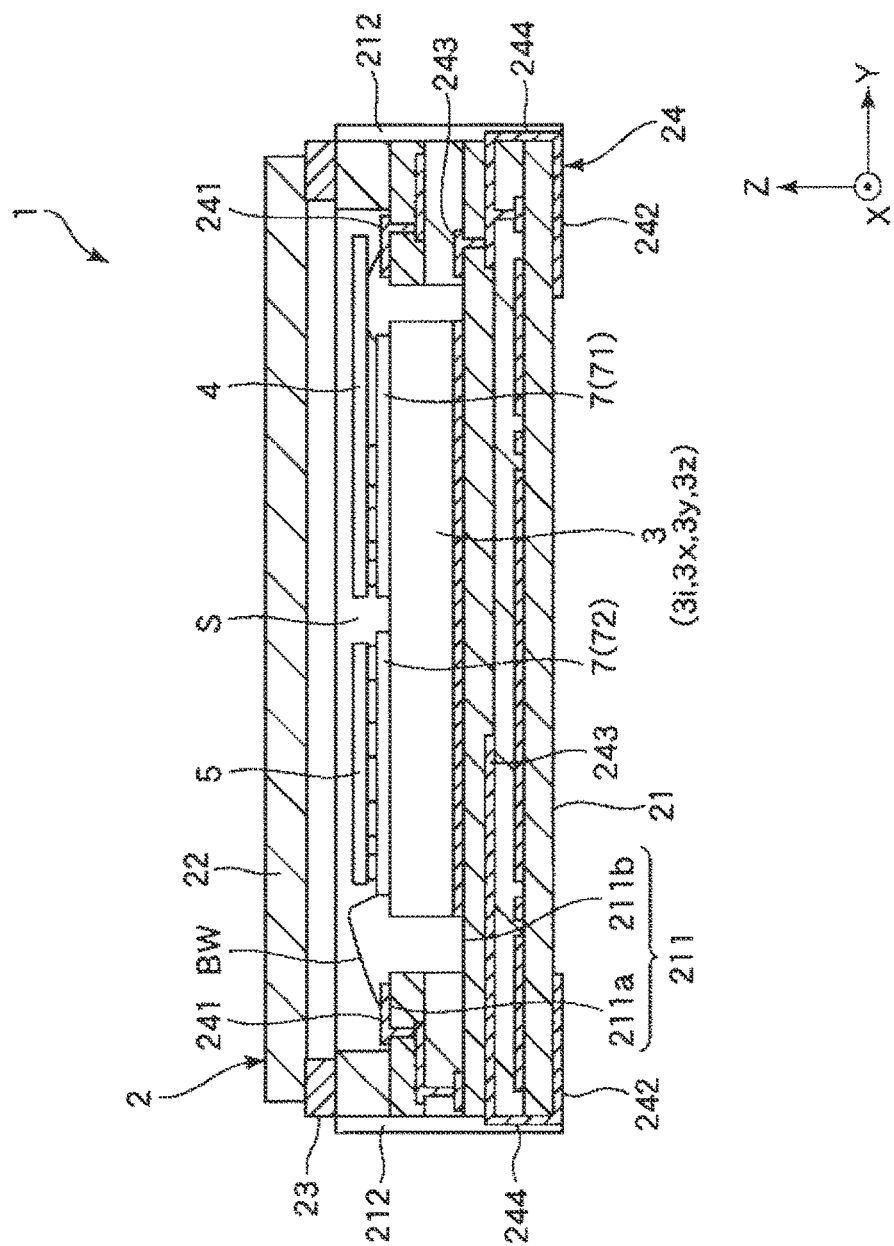
FIG. 5 is a sectional view of the physical quantity sensor shown in FIG. 4.
Figure 6:
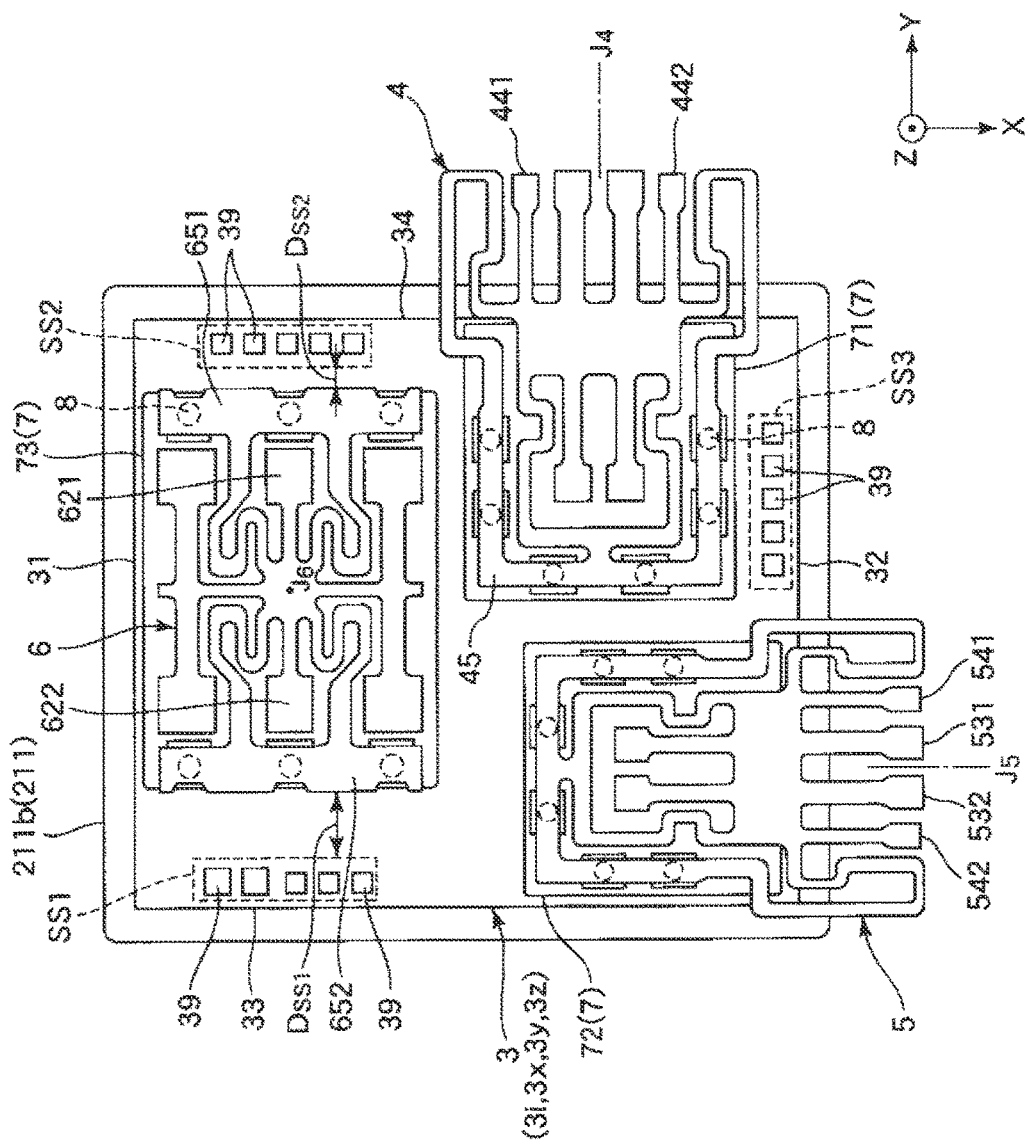
FIG. 6 is a plan view of the physical quantity sensor shown in FIG. 4.
Figure 7:
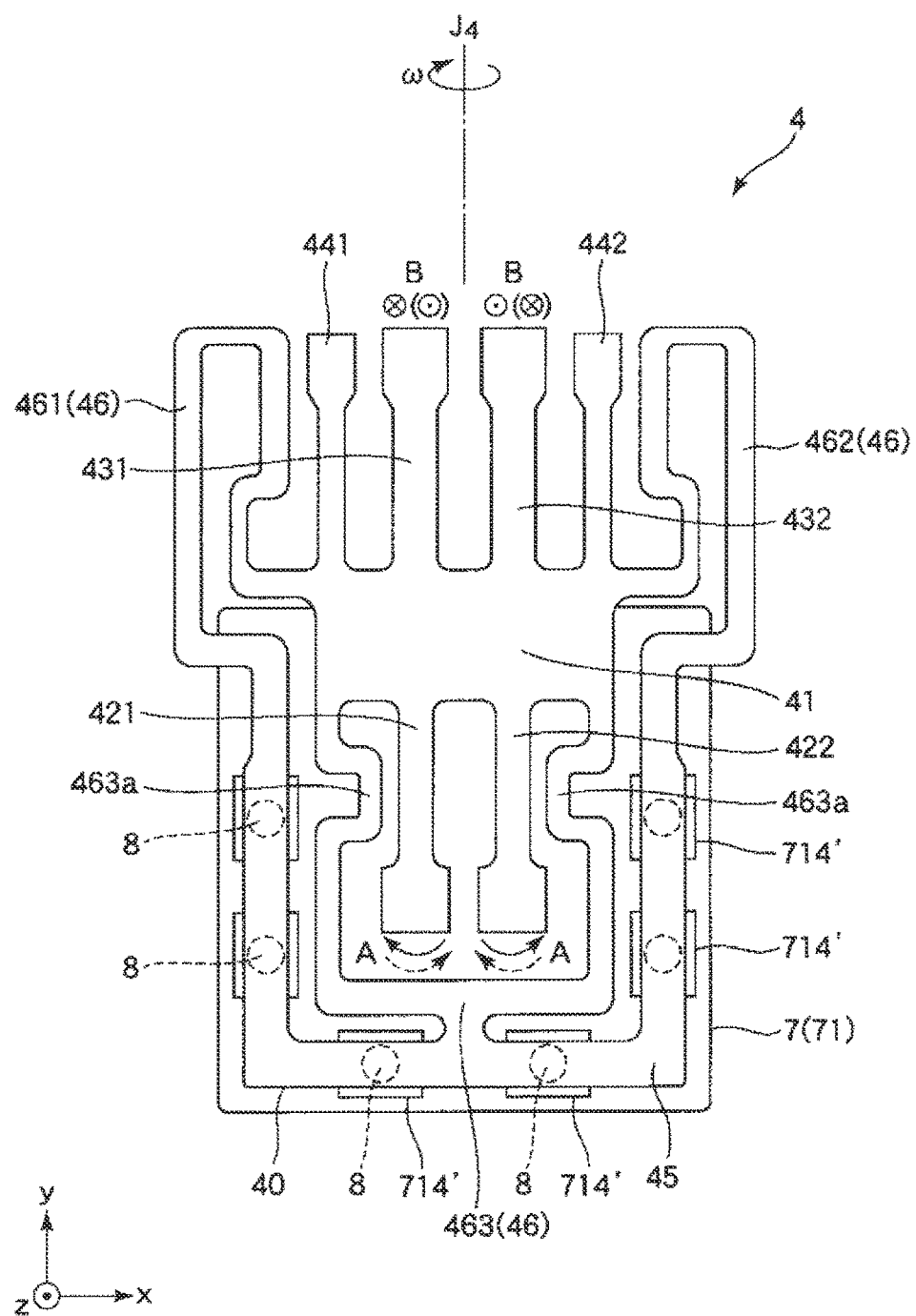
FIG. 7 is a plan view showing a physical quantity detecting vibration element of the physical quantity sensor shown in FIG. 4.
Figure 8:
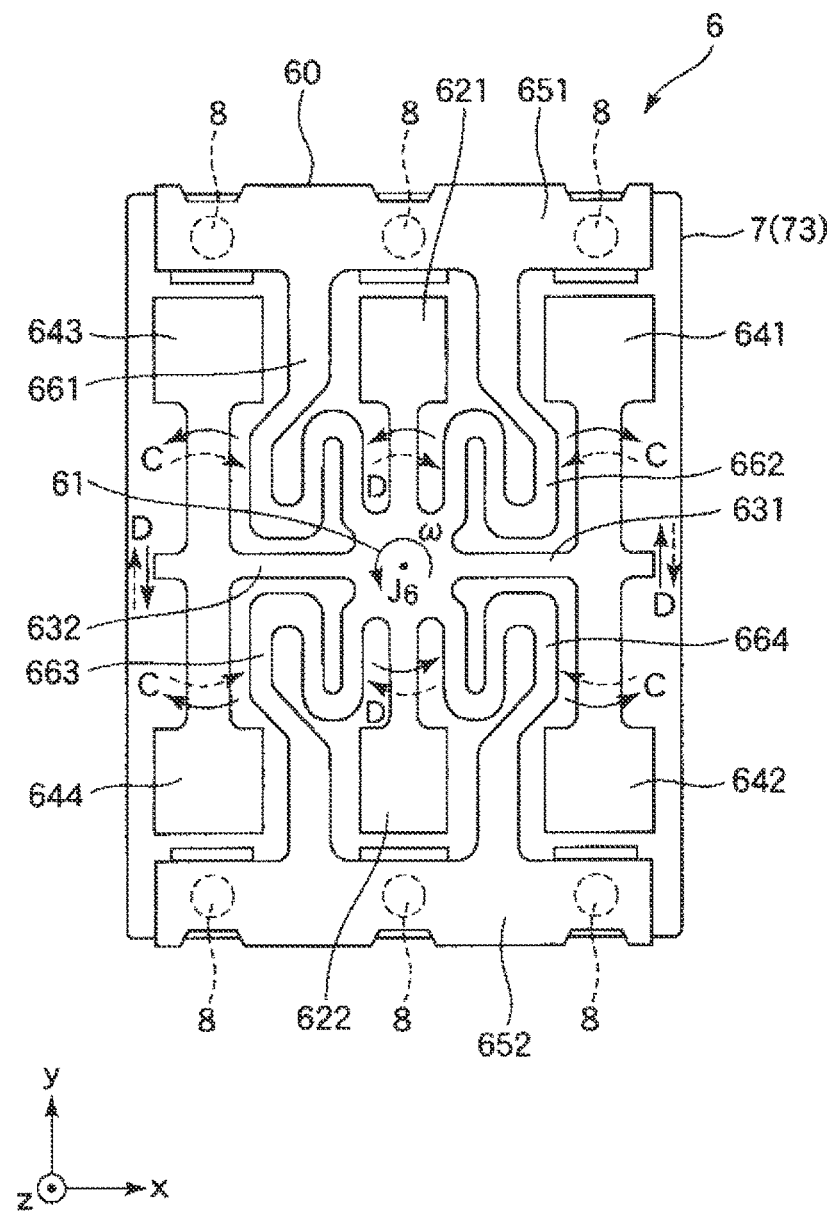
FIG. 8 is a plan view showing a physical quantity detecting vibration element of the physical quantity sensor shown in FIG. 4.
Figure 9:
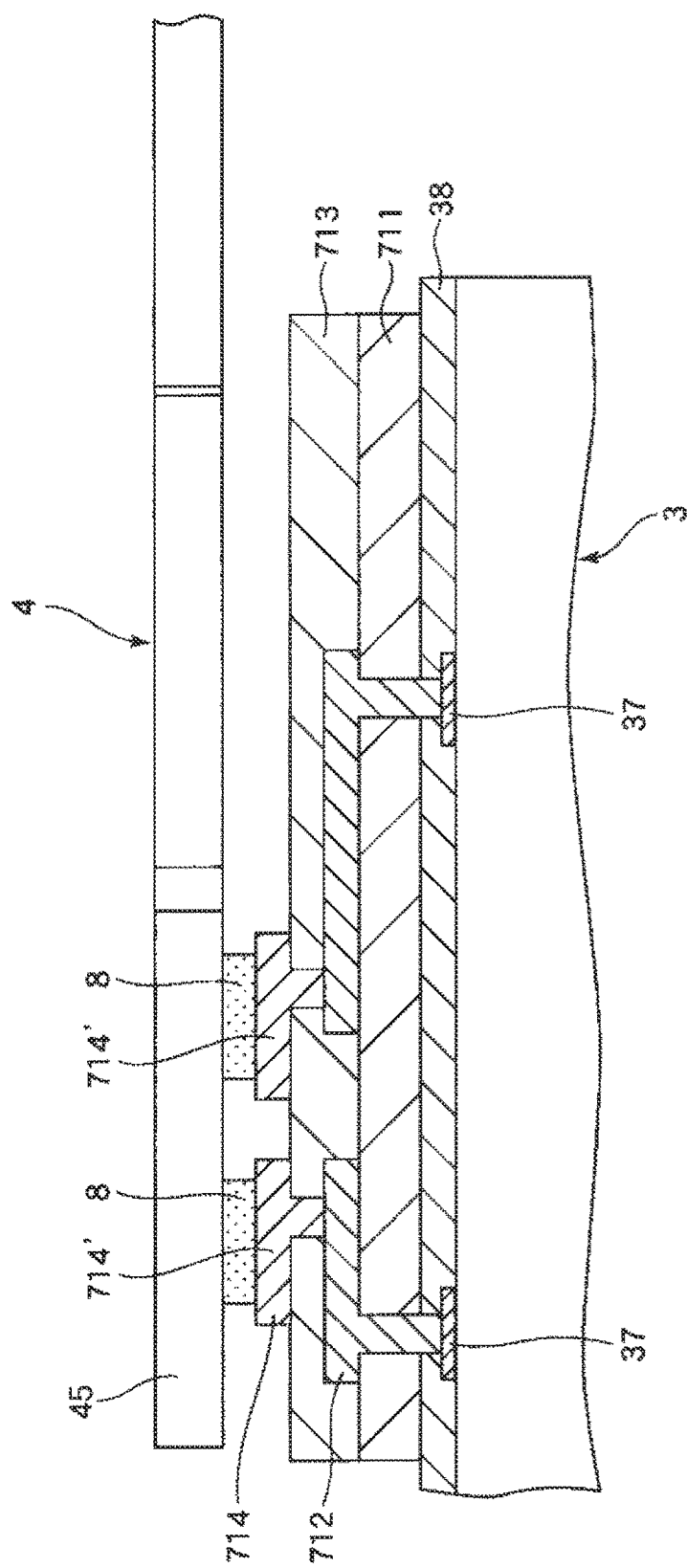
FIG. 9 is a sectional view showing a stress relaxation layer of the physical quantity sensor shown in FIG. 4.

FIG. 4 is a perspective view showing an example of a physical quantity sensor which is provided with the physical quantity detecting vibration element according to the invention. FIG. 5 is a sectional view of the physical quantity sensor shown in FIG. 4. FIG. 6 is a plan view of the physical quantity sensor shown in FIG. 4. FIG. 7 is a plan view showing a physical quantity detecting vibration element of the physical quantity sensor shown in FIG. 4. FIG. 8 is a plan view showing a physical quantity detecting vibration element of the physical quantity sensor shown in FIG. 4. FIG. 9 is a sectional view showing a stress relaxation layer of the physical quantity sensor shown in FIG. 4.

A physical quantity sensor 1 shown in FIG. 4 is a 3-axis angular velocity sensor and can independently detect angular velocity ωx around an X-axis, angular velocity ωy around a Y-axis, and angular velocity ωz around a Z-axis. The physical quantity sensor 1 includes a package 2 with an accommodation space S formed on the inside thereof, the IC (a semiconductor device) 3 accommodated in the accommodation space S, and three vibration elements (physical quantity detecting vibration elements) 4, 5, and 6 mounted on the IC 3 with a stress relaxation layer 7 interposed therebetween.

Package

The package 2 includes a box-shaped base 21 having a concave portion 211 which is open at the upper surface, a plate-shaped lid 22 which closes the opening of the concave portion 211, and a seam ring 23 which is interposed between the base 21 and the lid 22 and joins the base 21 and the lid 22 to each other, as shown in FIG. 5. Then, the IC 3 and the vibration elements 4, 5, and 6 are accommodated in the accommodation space S formed by closing the opening of the concave portion 211 by the lid 22. The atmosphere of the accommodation space S is not particularly limited. However, it is, for example, in a vacuum state (a reduced pressure state of less than or equal to 10 Pa). In this way, viscous resistance is reduced, and thus it is possible to efficiently drive the vibration elements 4, 5, and 6.

The base 21 has a substantially square shape when viewed in a plan view. Further, the concave portion 211 includes a first concave portion 211*a* which is open at the upper surface of the base 21, and a second concave portion 211*b* which is open at a central portion excluding an edge portion of the bottom surface of the first concave portion 211*a*. Further, a plurality of cutout portions 212 extending from the upper surface to the lower surface are formed in each side surface of the base 21. The base 21 can be formed by sintering a stack of a plurality of ceramic green sheets of, for example, aluminum oxide, aluminum nitride, silicon carbide, mullite, glass ceramic, or the like.

Wiring 24 is disposed at the base 21. The wiring 24 includes a plurality of internal terminals 241 disposed on the bottom surface of the first concave portion 211*a* and electrically connected to the IC 3 through a bonding wire BW, and a plurality of external terminals 242 disposed on the bottom surface of the base 21 and respectively electrically connected to the corresponding internal terminal 241. Further, the wiring includes internal wiring 243 formed in the base 21, or a castellation electrode 244 formed in the cutout portion 212, and each internal terminal 241 and the external terminal 242 corresponding thereto are electrically connected through the internal wiring 243 and the castellation electrode 244. Such wiring can be configured with, for example, tungsten (W), molybdenum (Mo), manganese (Mn), or the like, and with respect to portions (for example, the internal terminal 241, the external terminal 242, and the castellation electrode 244) exposed from the base 21, a plated metal layer of gold (Au) or the like may be formed on the surface thereof.

The lid 22 has a plate shape and is joined to the upper surface of the base 21 with the seam ring 23 interposed therebetween. As a constituent material of the lid 22, there is no particular limitation. However, it is preferable to use an alloy such as Kovar, for example. In addition, the lid 22 may be electrically connected to a ground wiring included in the wiring 24, through the seam ring 23, for example. In this way, it is possible to make the lid 22 function as a shield portion which blocks noise from the outside of the package 2.

IC

The IC 3 is fixed to the bottom surface of the second concave portion 211b by silver paste or the like. Further, the IC 3 has a substantially rectangular shape when viewed in a plan view, and the outer shape when viewed in a plan view has a pair of outer edges (sides) 31 and 32 extending in the Y-axis direction, and a pair of outer edges (sides) 33 and 34 extending in the X-axis direction, as shown in FIG. 6.

The IC 3 includes, for example, an interface unit 3i which performs communication with an external host device, a drive/detection circuit 3y which drives the vibration element 4 and detects the angular velocity ωy applied to the vibration element 4, a drive/detection circuit 3x which drives the vibration element 5 and detects the angular velocity ωx applied to the vibration element 5, and a drive/detection circuit 3z which drives the vibration element 6 and detects the angular velocity ωz applied to the vibration element 6. Further, a plurality of connection terminals 39 are disposed on the upper surface of the IC 3, and the connection terminals 39 and the internal terminals 241 are connected through the bonding wires BW. In this way, the IC 3 can perform communication with the host device through the external terminals 242. In addition, as a communication method of the IC 3, there is no particular limitation, and it is possible to use, for example, SPI (registered trademark) (Serial Peripheral Interface), or I²C (registered trademark) (Inter-Integrated Circuit). In particular, in the physical quantity sensor 1 of this embodiment, it is made so as to be able to select the communication method between SPI and I²C.

Here, the plurality of connection terminals 39 are disposed to be divided at three areas: a first terminal disposition area SS1, a second terminal disposition area SS2, and a third terminal disposition area SS3, set on the upper surface of the IC 3, as shown in FIG. 6. The first terminal disposition area SS1 is disposed along the outer edge 33 to be biased to the outer edge 31 side, the second terminal disposition area SS2 is disposed along the outer edge 34 to be biased to the outer edge 31 side, and the third terminal disposition area SS3 is disposed along the outer edge 32 to be biased to the outer edge 34 side.

In the first terminal disposition area SS1, for example, digital signal terminals such as a digital signal terminal for a slave select signal SS for selecting the communication method, a digital signal terminal for a data input signal MOSI, a digital signal terminal for a clock signal SCLK, and a digital signal terminal for a data output signal MISO are disposed together. In each of the second terminal disposition area SS2 and the third terminal disposition area SS3, for example, analog signal terminals such as a ground terminal for ground GND, a power-supply signal terminal for a power supply VDDI of the interface unit 3i, a power-supply signal terminal for a power supply VDD of the drive/detection circuits 3x, 3y, and 3z, and a test signal terminal for a test are disposed together.

In this manner, the digital signal terminals and the analog signal terminals are disposed to be divided at the different areas, whereby it is possible to reduce the incorporation of a digital signal to the analog signal terminals (wiring). For this reason, the physical quantity sensor 1 in which it is possible to reduce noise and it is possible to perform more accurate driving is provided. In particular, in this embodiment, the first terminal disposition area SS1 is disposed as far away from the second and third terminal disposition areas SS2 and SS3 as possible, and therefore, it is possible to more effectively exhibit the above-described effect.

Vibration Elements
Vibration Element 4

The vibration element 4 is a vibration element which is a so-called "H-type", and can detect the angular velocity ωy around the Y-axis. The vibration element 4 includes a vibrator element 40 made of quartz crystal, and an electrode (not shown) disposed at the vibrator element 40, as shown in FIG. 7. However, as a material of the vibrator element 40, it is not limited to the quartz crystal, and it is also possible to use a piezoelectric material such as lithium tantalate or lithium niobate, for example.

The vibrator element 40 has a plate shape spreading in the x-y plane which is defined by the x-axis and the y-axis which are the crystal axes of the quartz crystal, and has a thickness in the z-axis direction. Further, the vibrator element 40 includes a base portion 41, a pair of drive vibrating arms 421 and 422 extending side by side from the base portion 41 to the −y-axis side, a pair of detection vibrating arms 431 and 432 extending side by side from the base portion 41 to the +y-axis side, a pair of adjustment vibrating arms 441 and 442 which extends from the base portion 41 to the +y-axis side and is positioned on both sides of the detection vibrating arms 431 and 432, a support portion 45 supporting the base portion 41, and a connection portion 46 connecting the base portion 41 and the support portion 45.

The vibration element 4 is fixed to the stress relaxation layer 7 at the support portion 45. Further, the fixing of the vibration element 4 to the stress relaxation layer 7 is performed by using a fixing member 8 having electrical conductivity, and the vibration element 4 and the IC 3 are electrically connected through the fixing member 8 and the stress relaxation layer 7. As the fixing member 8, it is not particularly limited, and for example, a metal brazing material, a metal bump, an electrically-conductive adhesive, or the like can be used.

Further, the support portion 45 has an approximately "U" shape and is disposed so as to surround the pair of drive vibrating arms 421 and 422. Further, the connection portion 46 includes a beam portion 461 connecting an end portion on the −x-axis side of the base portion 41 and an end portion on the −x-axis side of the support portion 45, a beam portion 462 connecting an end portion on the +x-axis side of the base portion 41 and an end portion on the +x-axis side of the support portion 45, and a beam portion 463 connecting end portions on both sides in the x-axis direction of the base portion 41 and a central portion of the support portion 45. In particular, in this embodiment, each of the beam portions 461 and 462 has a shape extending in the +y-axis direction from the base portion 41 and folded back in the −y-axis direction, and the beam portion 463 has a shape having a curved portion 463a curved so as to meander in the middle thereof. In this way, it is possible to sufficiently soften the connection portion 46, and thus it is possible to reduce the occurrence of unnecessary vibration (in particular, vibration in a y-axis translation mode).

An excitation electrode (not shown) is provided in each of the drive vibrating arms 421 and 422, and a drive mode indicated by an arrow A is excited by applying an oscillation drive signal (alternating voltage) from the IC 3 (the drive/detection circuit 3y) to the excitation electrodes. Then, when the drive vibrating arms 421 and 422 are vibrating in the drive mode, if angular velocity co around a detection axis $J_4$ is applied, a detection mode indicated by an arrow B is excited. A detection electrode (not shown) is provided in each of the detection vibrating arms 431 and 432, and detection signals (electric charges) which are generated by the vibration of the detection vibrating arms 431 and 432 are extracted from the detection electrodes. Then, the IC 3 (the drive/detection circuit 3y) detects the angular velocity co based on the extracted detection signals.

Vibration Element 5

The vibration element 5 is a vibration element which is a so-called "H-type", and can detect the angular velocity ωx around the X-axis. The vibration element 5 has the same configuration as the vibration element 4 described above, and therefore, the description thereof is omitted.

Vibration Element 6

The vibration element 6 can detect the angular velocity ωz around the Z-axis. The vibration element 6 has the same configuration as that in the embodiment described above.

The vibration element 6 is fixed to the stress relaxation layer 7 at the support portions 651 and 652. Further, the fixing of the vibration element 6 to the stress relaxation layer 7 is performed by using the fixing member 8 having electrical conductivity, and the vibration element 6 (the respective terminals 671*b* to 674*b*) and the IC 3 are electrically connected through the fixing member 8 and the stress relaxation layer 7.

A drive signal is applied from the IC 3 (the drive/detection circuit 3*z*) to the drive signal electrode 673*a*, whereby a drive mode as indicated by an arrow C is excited, as shown in FIG. 8. Then, when the drive vibrating arms 641 to 644 are vibrating in the drive mode, if angular velocity co around a detection axis $J_6$ is applied, a detection mode as indicated by an arrow D is excited. Then, detection signals (electric charges) which are generated by the vibration of the detection vibrating arms 621 and 622 are extracted from the detection signal electrodes 671*a*. Then, the IC 3 (the drive/detection circuit 3*z*) detects the angular velocity co based on the extracted detection signals.

The configurations of the vibration elements 4, 5, and 6 have been described above. Next, the disposition of the vibration elements 4, 5, and 6 on the IC 3 will be described.

First, the disposition of the vibration element 4 will be described. The vibration element 4 is disposed such that the detection axis $J_4$ coincides with the Y-axis, as shown in FIG. 6. In this way, it is possible to detect the angular velocity ωy by the vibration element 4. Further, the vibration element 4 is disposed at a position biased to the outer edge 32 side and the outer edge 34 side of the upper surface of the IC 3. Further, the third terminal disposition area SS3 is positioned on the +X-axis side of the vibration element 4 (between the vibration element 4 and the outer edge 32), and the second terminal disposition area SS2 is positioned on the −X-axis side of the vibration element 4 (between the vibration element 4 and the outer edge 31). Further, the vibration element 4 is disposed with the adjustment vibrating arms 441 and 442 protruding from the outer edge 34 of the IC 3 to the +Y-axis side when viewed in a plan view. That is, the vibration element 4 is disposed such that the adjustment vibrating arms 441 and 442 do not overlap the IC 3 when viewed in a plan view.

Next, the disposition of the vibration element 5 will be described. The vibration element 5 is disposed such that a detection axis $J_5$ coincides with the X-axis, as shown in FIG. 6. In this way, it is possible to detect the angular velocity ωx by the vibration element 5. Further, the vibration element 5 is disposed at a position biased to the outer edge 32 side and the outer edge 33 side of the upper surface of the IC 3. For this reason, the vibration element 5 is positioned on the −Y-axis side with respect to the vibration element 4 and the outer edge 33). Further, the first terminal disposition area SS1 is positioned on the −X-axis side of the vibration element 5 (between the vibration element 5 and the outer edge 31). Further, the vibration element 5 is disposed with adjustment vibrating arms 541 and 542 protruding from the outer edge 32 of the IC 3 to the +X-axis side when viewed in a plan view.

Next, the disposition of the vibration element 6 will be described. The vibration element 6 is disposed such that the detection axis $J_6$ coincides with the Z-axis, as shown in FIG. 6. In this way, it is possible to detect the angular velocity ωz by the vibration element 6. Further, the vibration element 6 is disposed at a position biased to the outer edge 31 side of the upper surface of the IC 3. For this reason, the vibration element 6 is positioned on the −X-axis side with respect to the vibration elements 4 and 5 (between the vibration elements 4 and 5 and the outer edge 31). Further, the first terminal disposition area SS1 is positioned on the −Y-axis side of the vibration element 6 (between the vibration element 6 and the outer edge 33) and the second terminal disposition area SS2 is positioned on the +Y-axis side (between the vibration element 6 and the outer edge 34).

Here, as described in the above-described embodiment, the detection ground terminal 672*b* (the constant potential electrode 675) is widely disposed on the upper surface of each of the support portions 651 and 652 of the vibration element 6, and the detection ground terminal 672*b* (the constant potential electrode 675) functions as a shield layer which reduces the incorporation of noise to the detection signal terminal 671*b* or the drive signal terminal 673*b*. For this reason, the incorporation of the digital signal from the digital terminal (wiring) disposed in the first terminal disposition area SS1 to the detection signal terminal 671*b* and the drive signal terminal 673*b*, or the incorporation of the analog signal from the analog terminal (wiring) disposed in the second terminal disposition area SS2 to the detection signal terminal 671*b* and the drive signal terminal 673*b* is reduced.

Further, the vibration element 6 is disposed to be biased further to the second terminal disposition area SS2 side than the first terminal disposition area SS1. In other words, the vibration element 6 is disposed such that a distance $D_{SS2}$ between itself and the second terminal disposition area SS2 is shorter than a distance $D_{SS1}$ between itself and the first terminal disposition area SS1. In this way, the vibration element 6 can be separated from the first terminal disposition area SS1 as much as possible, and thus the incorporation of the digital signal to the vibration element 6 is reduced. For this reason, it is possible to reduce the incorporation of noise to the drive signal or the detection signal, and thus the physical quantity sensor 1 in which it is possible to perform more accurate driving is provided.

Further, the vibration element 6 is disposed such that an arrangement direction of the support portions 651 and 652 coincides with the Y-axis direction. In the vibration element 6, the length thereof in the arrangement direction of the support portions 651 and 652 is longer than the length thereof in a direction orthogonal thereto (an extending direction of the connection arms 631 and 632), and therefore, due to such disposition, it is possible to effectively utilize a space on the upper surface of the IC 3. For this reason, for example, it is possible to shorten the distance between the outer edge 31 and the outer edge 32, in other words, it is possible to shorten the lengths of the outer edge 33 and the outer edge 34, and thus it is possible to attain a reduction in the size of the IC 3.

As described above, the vibration elements 4 and 5 are disposed side by side in the Y-axis direction at the area on the outer edge 32 side of the upper surface of the IC 3 and the vibration element 6 is disposed at the area on the outer edge 31 side of the upper surface of the IC 3, whereby it is possible to dispose these three vibration elements 4, 5, and 6 in a relatively small space. For this reason, it is possible to attain a reduction in the size of the IC 3, and accordingly, it is possible to attain a reduction in the size of the physical quantity sensor 1.

In addition, the physical quantity sensor of this embodiment includes the three vibration elements 4, 5, and 6. However, as the number of vibration elements, it is not particularly limited as long as it includes the vibration element 6, and the vibration elements 4 and 5 may be omitted, and another vibration element or an acceleration detection element may be added.

Stress Relaxation Layer

The stress relaxation layer 7 is provided on the upper surface of the IC 3, as shown in FIGS. 4 and 6. Further, the stress relaxation layer 7 includes a first stress relaxation layer 71 which is provided between the IC 3 and the vibration element 4 and in which the vibration element 4 is mounted on the upper surface thereof, a second stress relaxation layer 72 which is provided between the IC 3 and the vibration element 5 and in which the vibration element 5 is mounted on the upper surface thereof, and a third stress relaxation layer 73 which is provided between the IC 3 and the vibration element 6 and in which the vibration element 6 is mounted on the upper surface thereof.

The first, second, and third stress relaxation layers 71, 72, and 73 are provided, whereby an impact that the package receives is relaxed, and thus it becomes difficult for the impact to be transmitted to the vibration elements 4, 5, and 6. Further, stress which is generated due to the difference in thermal expansion between the IC 3 and the vibration elements 4, 5, and 6 is relaxed, and thus the vibration elements 4, 5, and 6 are not easily deformed (bent). For this reason, by providing the first, second, and third stress relaxation layers 71, 72, and 73, it is possible to increase the mechanical strength of the physical quantity sensor 1 and it is possible to more accurately detect the angular velocity ωx, ωy, and ωz.

The first, second, and third stress relaxation layers 71, 72, and 73 have the same configuration as each other, and therefore, in the following, the first stress relaxation layer 71 will be described as a representative, and with respect to the second and third stress relaxation layers 72 and 73, the description thereof is omitted.

The first stress relaxation layer 71 includes, for example, an insulating film 711 stacked on the upper surface (a passivation film 38) of the IC 3, a wiring layer 712 formed on the insulating film 711 and electrically connected to the IC 3, an insulating film 713 formed on the wiring layer 712 and the insulating film 711, and a wiring layer 714 formed on the insulating film 713 and electrically connected to the wiring layer 712, as shown in FIG. 9. Then, the vibration element 4 is fixed to a terminal 714' provided in the wiring layer 714 through the fixing member 8. In this way, the IC 3 and the vibration element 4 are electrically connected through the wiring layers 712 and 714. In this manner, the wiring layers 712 and 714 function as wiring (rearrangement wiring) for electrically connecting the IC 3 and the vibration element 4. For this reason, a terminal 37 for being electrically connected to the vibration element 4, of the IC 3, can be freely disposed without considering the configuration (in particular, the position of a terminal) of the vibration element 4.

Each of the insulating films 711 and 712 is configured with a resin material having elasticity. As the resin material, it is not particularly limited. However, it is possible to use polyimide, silicone-modified polyimide resin, epoxy resin, silicone-modified epoxy resin, acrylic resin, phenol resin, silicone resin, modified polyimide resin, benzocyclobutene, polybenzoxazole, or the like.

In addition, in this embodiment, the stress relaxation layer 7 is divided into the first, second, and third stress relaxation layers 71, 72, and 73. However, the first, second, and third stress relaxation layers 71, 72, and 73 may be integrally formed. Further, the stress relaxation layer 7 may be omitted.

3. Electronic Apparatus

Subsequently, an electronic apparatus with the vibration element 6 applied thereto will be described in detail based on FIGS. 10 to 12.

Figure 10:
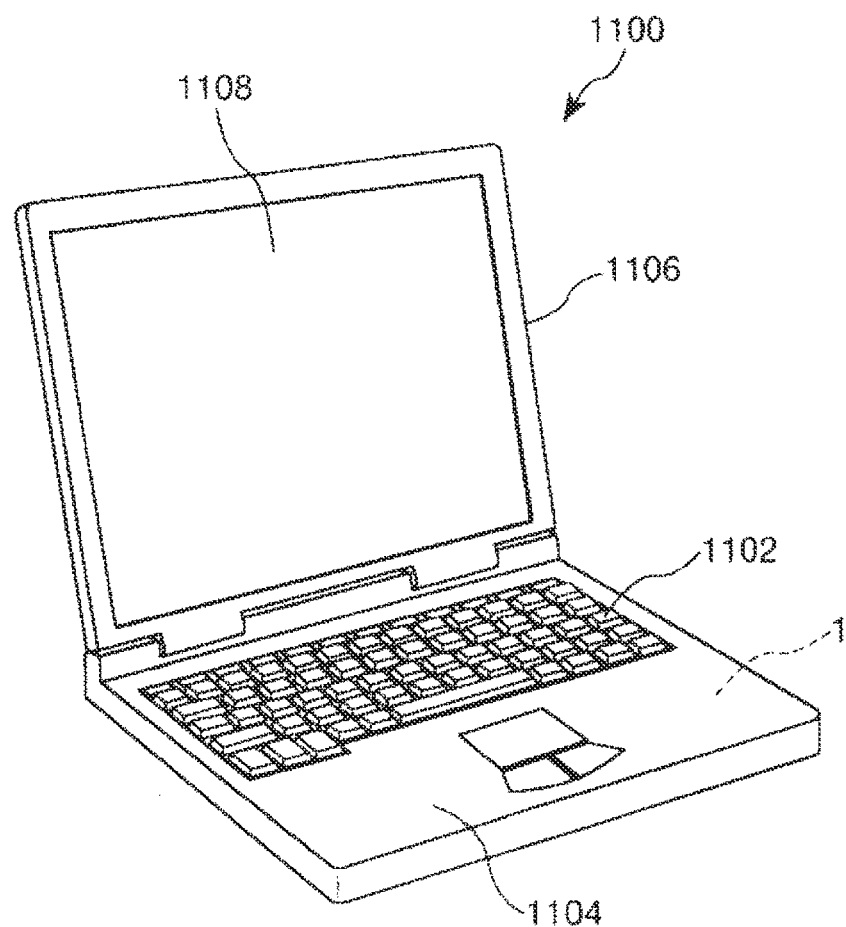
FIG. 10 is a perspective view showing the configuration of a mobile type (or a notebook type) personal computer with an electronic apparatus which is provided with the physical quantity detecting vibration element according to the invention applied thereto.

FIG. 10 is a perspective view showing the configuration of a mobile type (or a notebook type) personal computer with the electronic apparatus which is provided with the physical quantity detecting vibration element according to the invention applied thereto.

In this drawing, a personal computer 1100 is configured to include a main body section 1104 provided with a keyboard 1102, and a display unit 1106 provided with a display section 1108, and the display unit 1106 is supported so as to be able to rotate with respect to the main body section 1104 through a hinge structure section. The physical quantity sensor 1 (the vibration element 6) functioning as a angular velocity detection unit (a gyro sensor) is built into the personal computer 1100. For this reason, the personal computer 1100 can exhibit high reliability with higher performance.

Figure 11:
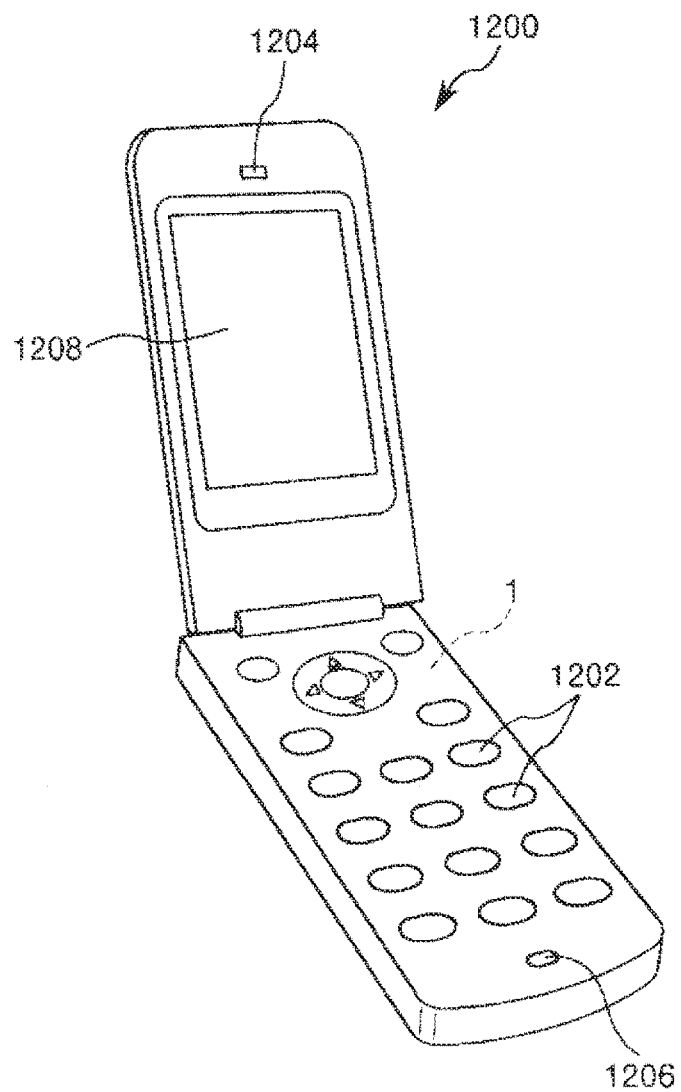
FIG. 11 is a perspective view showing the configuration of a mobile phone (also includes a PHS) with the electronic apparatus which is provided with the physical quantity detecting vibration element according to the invention applied thereto.

FIG. 11 is a perspective view showing the configuration of a mobile phone (also includes a PHS) with the electronic apparatus which is provided with the physical quantity detecting vibration element according to the invention applied thereto.

In this drawing, a mobile phone 1200 is provided with a plurality of operation buttons 1202, an ear piece 1204, and a mouthpiece 1206, and a display section 1208 is disposed between the operation buttons 1202 and the earpiece 1204. The physical quantity sensor 1 (the vibration element 6) functioning as the angular velocity detection unit is built into the mobile phone 1200. For this reason, the mobile phone 1200 can exhibit high reliability with higher performance.

Figure 12:
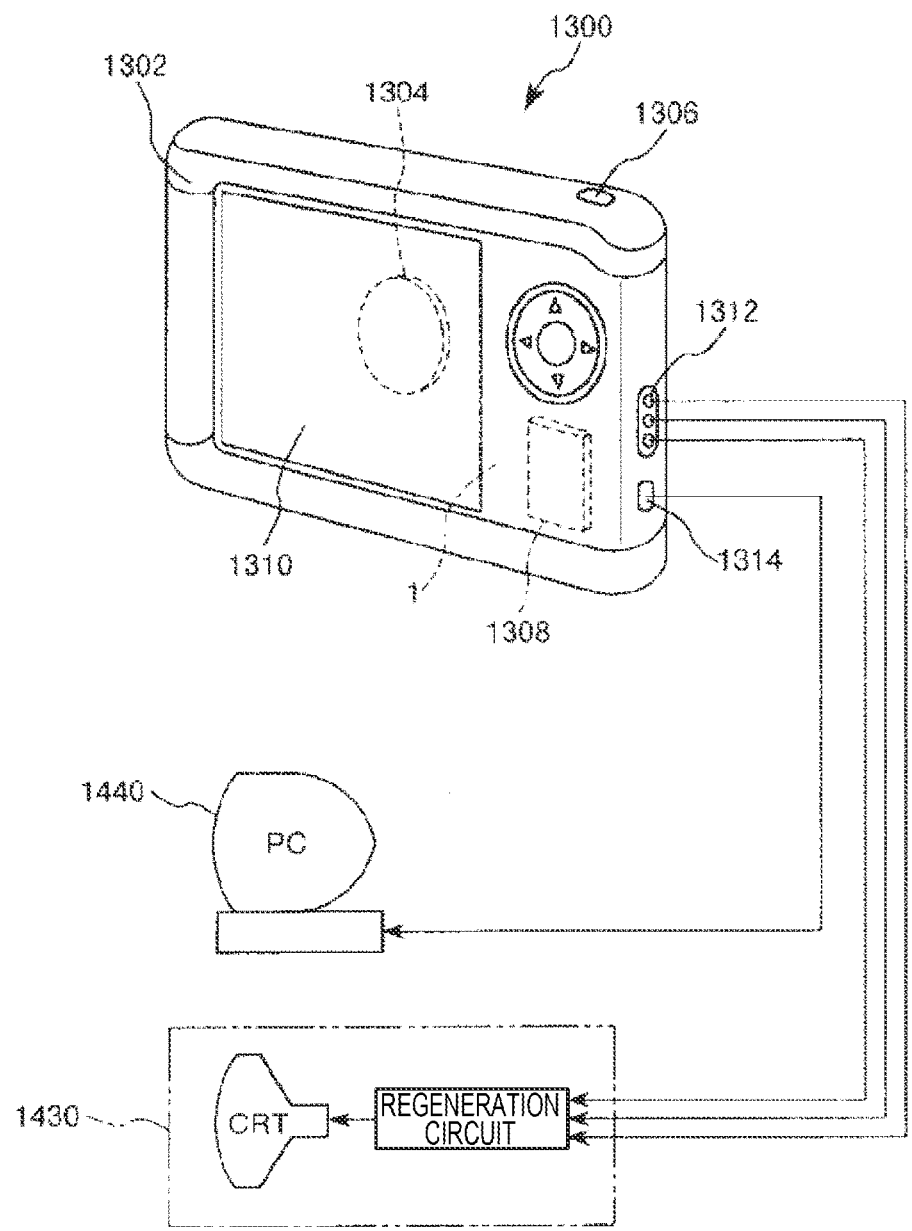
FIG. 12 is a perspective view showing the configuration of a digital still camera with the electronic apparatus which is provided with the physical quantity detecting vibration element according to the invention applied thereto.

FIG. 12 is a perspective view showing the configuration of a digital still camera with the electronic apparatus which is provided with the physical quantity detecting vibration element according to the invention applied thereto. In addition, in this drawing, connection with external equipment is also shown in a simplified manner.

A digital still camera 1300 produces an imaging signal (an image signal) by performing photoelectric conversion of an optical image of a photographic subject through an imaging element such as a charge coupled device (CCD). A configuration is made in which a display section 1310 is provided on the back surface of a case (a body) 1302 in the digital still camera 1300 and display is performed based on the imaging signal by the CCD, and the display section 1310 functions as a finder which displays the photographic subject as an electronic image. Further, a light receiving unit 1304 which includes an optical lens (an imaging optical system), the CCD, or the like is provided on the front side (the back side in the drawing) of the case 1302. If a photographer confirms a photographic subject image displayed on the display section 1310 and then presses a shutter button 1306, the imaging signal of the CCD at that point in time is transmitted to and stored in a memory 1308.

Further, in the digital still camera 1300, a video signal output terminal 1312 and an input-output terminal for data communication 1314 are provided on the side surface of the case 1302. Then, as shown in the drawing, as necessary, a television monitor 1430 is connected to the video signal output terminal 1312 and a personal computer 1440 is connected to the input-output terminal for data communication 1314. In addition, a configuration is made in which the imaging signal stored in the memory 1308 is output to the television monitor 1430 or the personal computer 1440 by a predetermined operation.

The physical quantity sensor 1 (the vibration element 6) functioning as the angular velocity detection unit is built into the digital still camera 1300. For this reason, the digital still camera 1300 can exhibit high reliability with higher performance.

In addition, the electronic apparatus which is provided with the physical quantity sensor according to the invention can be applied to, in addition to the personal computer (the mobile type personal computer) of FIG. 10, the mobile phone of FIG. 11, and the digital still camera of FIG. 12, for example, an ink jet type discharge apparatus (for example, an ink jet printer), a laptop type personal computer, a television, a video camera, a video tape recorder, a car navigation device, a pager, an electronic notebook (also including an electronic notebook with a communication function), an electronic dictionary, a desktop electronic calculator, electronic game equipment, a word processor, a workstation, a video phone, a security television monitor, electronic binoculars, a POS terminal, medical equipment (for example, an electronic thermometer, a sphygmomanometer, a blood glucose meter, an electrocardiogram measuring device, an ultrasonic diagnostic device, or an electronic endoscope), a fish finder, various measuring instruments, meters and gauges (for example, meters and gauges of a vehicle, an aircraft, or a ship), a flight simulator, or the like.

4. Moving Object

Subsequently, a moving object which is provided with the physical quantity detecting vibration element according to the invention will be described in detail based on FIG. 13.

Figure 13:
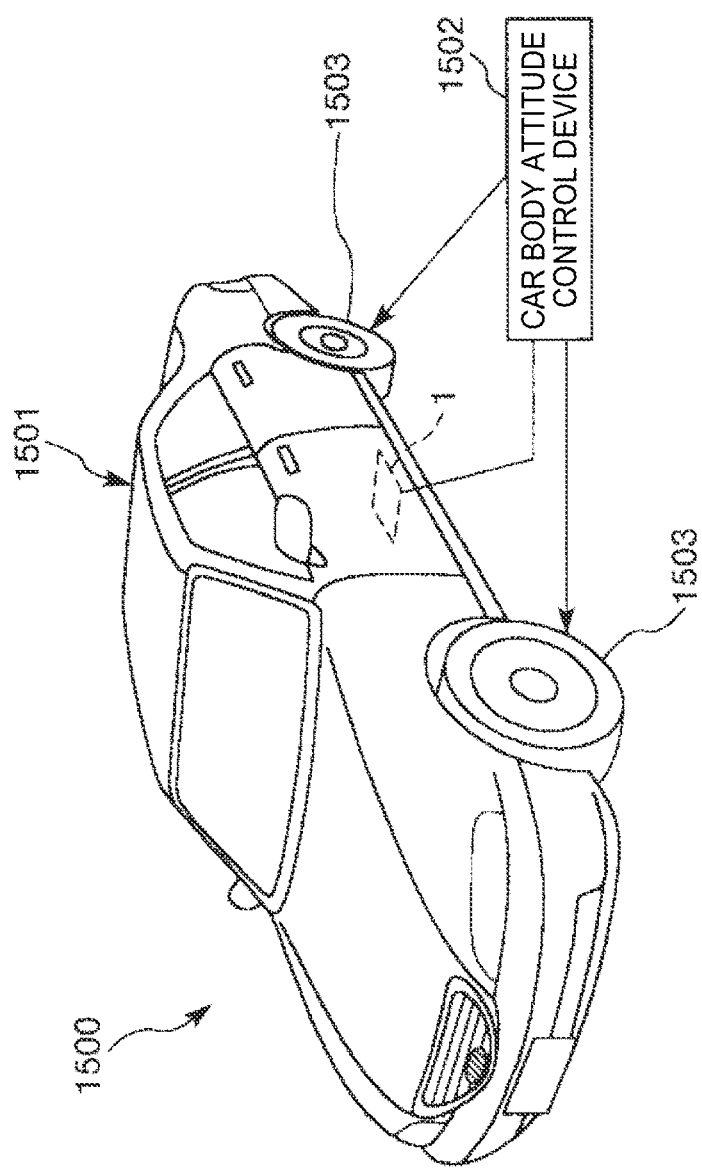
FIG. 13 is a perspective view showing the configuration of an automobile with a moving object which is provided with the physical quantity detecting vibration element according to the invention applied thereto.

FIG. 13 is a perspective view showing the configuration of an automobile with the moving object which is provided with the physical quantity detecting vibration element according to the invention applied thereto.

The physical quantity sensor 1 (the vibration element 6) functioning as the angular velocity detection unit is built into an automobile 1500, and it is possible to detect the attitude of a car body 1501 by the physical quantity sensor 1. A detection signal of the physical quantity sensor 1 is supplied to a car body attitude control device 1502, and the car body attitude control device 1502 detects the attitude of the car body 1501 based on the signal and can control the hardness and softness of a suspension or control a brake of an individual wheel 1503 according to a detection result. In addition, such attitude control can be utilized in a bipedal walking robot or a radio-controlled helicopter. As described above, the physical quantity sensor 1 is incorporated for realization of the attitude control of various moving objects.

The physical quantity detecting vibration element, the physical quantity sensor, the electronic apparatus, and the moving object according to the invention have been described above based on the embodiments shown in the drawings. However, the invention is not limited thereto and the configuration of each section can be replaced with any configuration having the same function. Further, any other configuration may be added to the invention. Further, the invention may include a combination of two or more of optional configurations (characteristics) of the respective embodiments described above.

Further, in the embodiment described above, a configuration has been described in which the detection ground terminal 672$b$ includes the first portion 672$b$1 to the fourth portion 672$b$4. However, the second portion 672$b$2 to the fourth portion 672$b$4 may be omitted.

Further, in the embodiment described above, the detection ground terminal 672$b$ configuring the fourth portion 672$b$4 (the constant potential electrode 675) is electrically connected to the detection ground electrode 672$a$. However, as the fourth portion 672$b$4 (the constant potential electrode 675), it may not be electrically connected to the detection ground electrode 672$a$ as long as it is connected to a constant potential. Further, the fourth portion 672$b$4 (the constant potential electrode 675) is not limited to a ground as long as it has constant potential.

The entire disclosure of Japanese Patent Application Nos: 2014-219771, filed Oct. 28, 2014 and 2014-219772, filed Oct. 28, 2014 are expressly incorporated by reference herein.

What is claimed is:

1. A physical quantity detecting vibration element comprising:
  a vibration body having a detection vibration portion;
  a support portion which supports the vibration body and includes a first end portion and a second end portion;
  a beam portion which connects the vibration body and a connection portion of the support portion between the first end portion and the second end portion;
  a detection signal electrode provided in the detection vibration portion;
  a detection signal terminal which is provided on a principal surface on one side of the support portion and electrically connected to the detection signal electrode; and
  a constant potential terminal which is provided on the principal surface on the one side of the support portion and electrically connected to a constant potential, wherein
  a portion of the constant potential terminal is disposed so as to be positioned further toward a first end portion side of the first end portion than the connection portion, and
  the detection signal terminal is disposed further toward the first end portion side than the connection portion and is disposed between the connection portion and the portion of the constant potential terminal of the support portion along a direction extending between the first and second end portions of the support portion.

2. The physical quantity detecting vibration element according to claim 1, further comprising:
  a detection ground electrode provided in the detection vibration portion, wherein
  the detection ground electrode and the constant potential terminal are electrically connected.

3. The physical quantity detecting vibration element according to claim 1, wherein
  the constant potential terminal is further disposed between the detection signal terminal and the first end portion of the support portion.

4. The physical quantity detecting vibration element according to claim 1, wherein the constant potential terminal is further disposed at a portion overlapping the detection signal terminal on the principal surface on the other side of the support portion.

5. The physical quantity detecting vibration element according to claim 1, wherein
the beam portion includes a pair of first and second beam portions,
the connection portion includes a first connection portion connecting with the first beam portion on the one side of the support portion and a second connection portion connecting with the second beam portion on the other side, and
the constant potential terminal is disposed between the first connection portion and the second connection portion, and is disposed to extend further to the first end portion side than the first connection portion.

6. The physical quantity detecting vibration element according to claim 5, wherein
the constant potential terminal is further disposed to extend further to a second end portion side of the second end portion than the second connection portion.

7. The physical quantity detecting vibration element according to claim 6, wherein
the vibration body includes a drive vibration portion, and the physical quantity detecting vibration element further comprises:
a drive signal electrode provided in the drive vibration portion; and
a drive signal terminal which is provided between the constant potential terminal on the principal surface on the one side of the support portion and the second end portion and electrically connected to the drive signal electrode.

8. The physical quantity detecting vibration element according to claim 7, wherein
the constant potential terminal is further disposed between the drive signal terminal and the second end portion of the support portion.

9. The physical quantity detecting vibration element according to claim 8, wherein
the constant potential terminal is further disposed at a portion overlapping the drive signal terminal on the principal surface on the other side of the support portion.

10. A physical quantity sensor comprising: the physical detecting vibration element according to claim 1.

11. An electronic apparatus comprising: the physical detecting vibration element according to claim 1.

12. A moving object comprising: the physical quantity detecting vibration element according to claim 1.

* * * * *